US009070932B2

(12) United States Patent
Byon et al.

(10) Patent No.: US 9,070,932 B2
(45) Date of Patent: Jun. 30, 2015

(54) CARBON ELECTRODES

(75) Inventors: Hye Ryung Byon, Saitama (JP); Seung Woo Lee, Cambridge, MA (US); Betar Gallant, Cambridge, MA (US); Yang Shao-Horn, Cambridge, MA (US); Paula Hammond, Newton, MA (US); Nasim Hyder, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 398 days.

(21) Appl. No.: 13/270,553

(22) Filed: Oct. 11, 2011

(65) Prior Publication Data
US 2013/0089790 A1 Apr. 11, 2013

(51) Int. Cl.
| | |
|---|---|
| *H01M 4/13* | (2010.01) |
| *H01M 4/58* | (2010.01) |
| *H01M 4/88* | (2006.01) |
| *H01G 11/36* | (2013.01) |
| *H01G 11/50* | (2013.01) |
| *H01M 4/133* | (2010.01) |
| *H01M 4/587* | (2010.01) |
| *H01G 11/06* | (2013.01) |
| *H01M 4/36* | (2006.01) |

(52) U.S. Cl.
CPC .............. *H01M 4/133* (2013.01); *H01G 11/06* (2013.01); *H01G 11/36* (2013.01); *H01G 11/50* (2013.01); *H01M 4/362* (2013.01); *H01M 4/587* (2013.01); *Y02E 60/122* (2013.01); *Y02E 60/13* (2013.01); *Y10T 29/417* (2015.01); *Y10T 29/49108* (2015.01)

(58) Field of Classification Search
None
See application file for complete search history.

(56) References Cited

U.S. PATENT DOCUMENTS

| | | |
|---|---|---|
| 2011/0026189 A1 | 2/2011 | Wei et al. |
| 2011/0287341 A1 | 11/2011 | Inoue et al. |

FOREIGN PATENT DOCUMENTS

| | | | | |
|---|---|---|---|---|
| WO | WO 2011/036387 | * | 3/2011 | ............ C01B 31/02 |

OTHER PUBLICATIONS

Machine translation of WO 2011/036387, retrieved from <http://worldwide.espacenet.com/?locale=en_EP> on Oct. 25, 2013.*
Li et. al., Sustained growth of ultralong carbon nanotube arrays for fiber spinning, Advanced Materials, 2006, 18(23), 3160-3163.*
International Search Report; mailed May 13, 2013; International Application No. PCT/US2012/059692.
Lee, S. W. et al., "High-power lithium batteries from functionalized carbon-nanotube electrodes," *Nature Nanotechnology*, vol. 5, No. 7, Jul. 1, 2010, pp. 531-537.
Lee, S. W. et al., "Nanostructured carbon-based electrodes: bridging the gap between thin-film lithium-ion batteries and electrochemical capacitors," *Energy & Environmental Science*, vol. 4, No. 6, Jan. 1, 2011, p. 1972.
Chew, S. Y. et al, "Flexible free-standing carbon nanotube films for model lithium-ion batteries," *Carbon*, vol. 47, No. 13, Nov. 1, 2009, pp. 2976-2983.
Ng, S. H. et al., "Single wall carbon nanotube paper as anode for lithium-ion battery," *Electrochimica Acta*, vol. 51, No. 1, Oct. 5, 2005, pp. 24-25.

(Continued)

*Primary Examiner* — Cynthia K. Walls
(74) *Attorney, Agent, or Firm* — Steptoe & Johnson LLP

(57) ABSTRACT

A self-supporting carbon electrode can include, or consist essentially of, nanostructured carbon, for example, oxygen-functionalized nanostructured carbon.

13 Claims, 25 Drawing Sheets

(56) References Cited

OTHER PUBLICATIONS

Byon, H. R. et al., "Thin films of carbon nanotubes and chemically reduced graphenes for electrochemical micro-capacitors," *Carbon*, vol. 49, No. 2, Sep. 29, 2010, pp. 457-467.

Xu, G. et al., "Binder-free activated carbon/carbon nanotube paper electrodes for use in supercapacitors," *Nano Research*, vol. 4, No. 9, Sep. 1, 2011, pp. 870-881.

Zhi-Qiang, N. et al., "Cross-Disciplinary Physics and Related Areas of Science and Technology; Fabrication and electrochemical properties of free-standing single-walled carbon nanotube film electrodes," *Chinese Physics*, vol. 20, No. 2, Feb. 4, 2011, p. 28101.

Lee, S. W. et al., "Self-standing positive electrodes of oxidized few-walled carbon nanotubes for light-weight and high-power lithium batteries," *Energy & Environmental Science*, vol. 5, No. 1, Jan. 1, 2012, p. 5437.

S. W. Lee, B. M. Gallant, H. R. Byon, P. T. Hammond and Y. Shao-Horn, *Energy & Environmental Science*, 2011, 4, 1972-1985.

S. W. Lee, B.-S. Kim, S. Chen, Y. Shao-Horn and P. T. Hammond, *Journal of the American Chemical Society*, 2009, 131, 671-679.

H. Ago, T. Kugler, F. Cacialli, W. R. Salaneck, M. S. P. Shaffer, A. H. Windle and R. H. Friend, *Journal of Physical Chemistry B*, 1999, 103, 8116-8121.

C. Kozlowski and P. M. A. Sherwood, *Journal of the Chemical Society-Faraday Transactions I*, 1985, 81, 2745-2756.

S. W. Lee, N. Yabuuchi, B. M. Gallant, S. Chen, B. S. Kim, P. T. Hammond and Y. Shao-Horn, *Nature Nanotechnology*, 2010, 5, 531-537.

D. Y. Kim, H. Sugime, K. Hasegawa, T. Osawa and S. Noda, *Carbon*, 2011, 49, 1972-1979.

B. E. Conway, *Electrochemical Supercapacitors: Scientific Fundamentals and Technological Applications*, Kluwer, Dordrecht, the Netherlands, 1999.

P. Simon and Y. Gogotsi, *Nature Materials*, 2008, 7, 845-854.

H. R. Byon, S. W. Lee, S. Chen, P. T. Hammond and Y. Shao-Horn, *Carbon*, 49(2) 457-467 (2011).

W. S. Hummers and R. E. Offeman, *J. Am. Chem. Soc.*, 1958, 80, 1339.

N. I. Kovtyukhova, P. J. Ollivier, B. R. Martin, T. E. Mallouk, S. A. Chizhik, E. V. Buzaneva and A. D. Gorchinskiy, *Chem. Mater.*, 1999, 11, 771-778.

D. Li, M. B. Müller, S. Gilje, R. B. Kaner and G. G. Wallace, *Nat. Nanotech.*, 2008, 3, 101-105.

U. Zielke, K. J. Hüttinger and W. P. Hoffman, *Carbon*, 1996, 34, 983-998.

O. C. Compton, D. A. Dikin, K. W. Putz, C. Brinson and S. T. Nguyen, *Adv. Mater.*, 2010, 22, 892-896.

\* cited by examiner

CARBON ELECTRODES

TECHNICAL FIELD

This invention relates to carbon electrodes for use in energy storage devices, particularly as positive electrodes, and methods of making and using the carbon electrodes.

BACKGROUND

As the sustainability of traditional energy sources and storage methods has come into question, recent research has focused on the development of novel energy conversion and storage devices. Presently, conventional lithium-ion batteries are widely used in part because of their high gravimetric energy densities (~200 Wh/$kg_{cell}$ at ~1 kW/$kg_{cell}$). However, lithium-ion batteries can achieve high-power performance (>50 kW/$kg_{cell}$) only at the expense of cell robustness and safety. Next-generation energy storage applications, such as load-leveling and electrified propulsion, require higher levels of energy and power performance. Accordingly, there remains a need for energy storage devices that provide both high energy density and high power capability.

Future applications for electrochemical energy storage will demand both high gravimetric energy and power. To meet these goals, there is a need for devices that can span the performance gaps between existing technologies, which include lithium-ion batteries and electrochemical capacitors (ECs or supercapacitors). Energy storage devices desirably have a variety of additional properties, such as long cycle life, compact size, light weight, operational safety, and flexibility. The nature and properties of electrodes in an energy storage device determines the overall performance of the device.

SUMMARY

Carbon electrodes for use in, e.g., energy storage devices such as batteries, are described. Advantageously, the carbon electrodes are self-supporting and binder-free, and can be tens of microns in thickness. The electrodes can be made by a simple filtration process from nanostructured carbon materials such as oxidized few-walled carbon nanotubes (FWNTs), oxidized multi-walled carbon nanotubes (MWNTs), and oxidized graphene.

The energy storage properties of the carbon electrode are related to the extent of oxidation of the nanostructured materials, in particular, the oxygen-carbon ratio. Controlling the extent of oxidation not only controls the electrical properties of the electrode, but also the surface chemistry. By utilizing a suitable electrode synthesis procedure, electrodes can be made with thicknesses on the order of tens of microns in thickness. Furthermore, these electrodes can be self-supporting (free standing) and binder free.

In the case of FWNT-based electrodes, sub-millimeter length FWNTs minimize the number of junctions between carbon structures, which can enhance electrical conductivity and mechanical integrity. In the case of MWNT-graphene electrodes, MWNTs can allow successful utilization of the high surface areas of graphene by serving as a "pillar" inserted between graphene sheets that helps reduce the extent of agglomeration, providing an ordered, hierarchical structure with electrochemically accessible surfaces.

The amount of oxygen functional groups present on the carbon materials can be on carbons controlled by adjusting oxidation conditions. Oxygen functional groups in the nanostructured carbon can undergo Faradaic reactions with lithium ions in lithium cells. Therefore, the energy density of carbon electrodes can be controlled by oxidation conditions. Lithium cells with a high gravimetric energy of ~250 Wh/kg at a high power of ~1 kW/kg are described, indicating that self-supporting carbon electrodes (free of polymer binder and metal collector) are promising positive electrodes for high power rechargeable lithium batteries.

In one aspect, a self-supporting carbon electrode includes nanostructured carbon. The carbon electrode can be used as a positive electrode or negative electrode in an energy storage device. In some embodiments, the carbon electrode can preferably be used as a positive electrode in an energy storage device. The self-supporting carbon electrode can consist essentially of nanostructured carbon. The self-supporting carbon electrode can have a thickness of 1 μm or greater, or 10 μm or greater.

The nanostructured carbon can be oxygen-functionalized nanostructured carbon. The oxygen-functionalized nanostructured carbon can include oxygen-functionalized FWNTs, MWNT-COOH, GO, rGO, rGO—COOH, or a combination thereof. The oxygen-functionalized nanostructured carbon can include oxygen-functionalized FWNTs having an aspect ratio of 10,000 or greater. The self-supporting carbon electrode can be free of binders or other additives. The self-supporting carbon electrode can consist essentially of oxygen-functionalized conductive carbon. The self-supporting carbon electrode can consist essentially of carbon and oxygen.

In another aspect, an energy storage device includes a self-supporting carbon electrode including oxygen-functionalized nanostructured carbon. The carbon electrode can be the positive electrode or negative electrode in the energy storage device. In some embodiments, the carbon electrode can preferably be the positive electrode in the energy storage device. The energy storage device can provide at least 100 Wh/$kg_{electrode}$ at 10 kW/$kg_{electrode}$ or at least 150 Wh/$kg_{electrode}$ at 10 kW/$kg_{electrode}$. The energy storage device can further include a lithium-containing electrode and an electrolyte interposed between the lithium-containing electrode and the self-supporting carbon positive electrode. The energy storage device can be a rechargeable lithium battery.

In another aspect, a method of making an energy storage device includes selecting a desired property of a carbon electrode; oxidizing nanostructured carbon to a predetermined degree based on the desired property, thereby forming oxygen-functionalized nanostructured carbon; and forming a carbon electrode including the oxygen-functionalized nanostructured carbon, whereby the carbon electrode possesses the desired property. The carbon electrode can be the positive electrode or negative electrode in the energy storage device. In some embodiments, the carbon electrode can preferably be the positive electrode in the energy storage device.

The desired property can be an energy storage density. The carbon positive electrode can be self-supporting. The carbon positive electrode can consist essentially of oxygen-functionalized nanostructured carbon. The oxygen-functionalized nanostructured carbon can include oxygen-functionalized FWNTs, MWNT-COOH, GO, rGO, rGO—COOH, or a combination thereof.

In another aspect, a self-supporting carbon electrode comprising nanostructured carbon and a second energy storage material. The carbon electrode can be a carbon positive electrode or a carbon negative electrode. In some embodiments, the carbon electrode can preferably be used as the positive electrode in an energy storage device. The second energy storage material can include a conductive polymer. The second energy storage material can include PANi. The second energy storage material can include a lithium metal oxide, a lithium metal fluoride, a lithium metal phosphate, or a combination thereof. The second energy storage material can include nano-size $TiO_2$.

Other aspects, embodiments, and features will be apparent from the following description, the drawings, and the claims.

BRIEF DESCRIPTION OF THE DRAWINGS

FIG. 5d is an SEM cross-section view image of an electrode prepared by vacuum filtration of a 4-hr oxidized FWNT solution.

FIG. 8d shows gravimetric discharge capacity at 0.1 A/g upon galvanostatic discharge as a function of oxidation time.

FIG. 13b is a high-magnification image of FIG. 13a. FIG. 13c shows MWNT-COOH/rGO—COOH; FIG. 13d, MWNT/rGO; FIGS. 13e-13f, ~70 and ~250 µm of MWNT-COOH/rGO—COOH, respectively. The inset in FIG. 13f is a high magnification image of FIG. 13e.

FIG. 14 (bottom) shows the corresponding atomic percentage concentrations of MWNT-COOH/GO, MWNT-COOH/rGO—COOH, and MWNT/rGO.

DETAILED DESCRIPTION

Nanostructured carbon (e.g., conductive nanostructured carbon) can be used in electrodes for energy storage devices, e.g., rechargeable Li batteries or electrochemical capacitors.

Several unique characteristics of nanostructured electrodes make them ideal candidates for combining high energy and power at the material level. These advantages include: increased electrochemically active surface areas for charge transfer, reduction of electronic and ionic transport resistance at smaller diffusion length scales, and the ability to incorporate high energy materials into an outer nanostructured framework capable of sustaining high power.

The surfaces of nanostructured carbon can be functionalized with sites capable of undergoing Faradaic reactions, e.g., oxygen-containing sites or oxygen functional groups (e.g., —OH, —COOH). Functionalized nanostructured carbon can be assembled using a simple vacuum filtration (VF) method to yield self-supporting, binder-free electrodes with energy densities similar to those available with Li-ion batteries (e.g., 200 Wh/kg$_{electrode}$), yet with power (10 kW/kg$_{electrodes}$) substantially higher than available with Li-ion batteries. The extent of functionalization can be controlled, such that energy and power characteristics of energy storage devices can be tuned. Design principles for functionalized carbon-based electrodes are discussed, including the roles of factors such as carbon structure, electrode thickness, oxygen content, and electrical conductivity in modulating the energy-power characteristics.

Figure 1A:
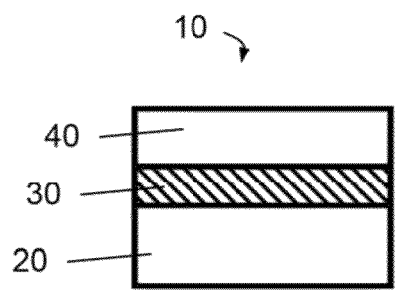
FIG. 1a is a schematic illustration of components of an energy storage device.

With regard to FIG. 1a, battery 10 includes first electrode 20, electrolyte 30, and second electrode 40. Electrolyte 30 is interposed between first electrode 20 and second electrode 40 and facilitates transport of material (e.g., ions) between first electrode 20 and second electrode 40. In some cases, electrolyte 30 takes the form of a porous separator which includes the electrolyte. First electrode 20, electrolyte 30, and second electrode 40 are typically enclosed within a casing (not shown). The casing is configured such that first electrode 20 and second electrode 40 can be electrically connected by an external circuit. When so connected, the battery can produce electric current in the circuit for performing electrical work. In some cases, the battery can be recharged when the external circuit includes a power source configured to recharge the battery.

First electrode 20 can include a metal, an alloy, or a carbon-based material, e.g., porous carbon, graphite, a nanostructured conductive carbon, organic polymers, other carbon-based materials, carbon-supported metal oxides such as TiO$_2$, or combinations of these. A carbon-based first electrode 20 can optionally include binders, additives, or other materials.

Battery 100 can be a metal/carbon battery, e.g., where one active material is a metal such as lithium, sodium, magnesium, calcium, or zinc. The battery can be a lithium battery, i.e., where second electrode 40 includes lithium metal or a lithium compound, such as a lithium metal oxide (e.g., a lithium cobalt oxide or a lithium manganese oxide). The term "battery" as used herein includes primary and secondary (rechargeable) batteries. Examples of lithium batteries include but are not limited to Li batteries (i.e., lithium metal batteries), Li-ion batteries, Li-ion polymer batteries, Li-air batteries, Li—MnO$_2$ batteries, Li—S batteries, Li—SOCl$_2$ batteries, Li—SOCl$_2$—BrCl batteries, Li—SO$_2$Cl$_2$ batteries, Li—SO$_2$ batteries, Li—(CF)$_x$ batteries, Li—I$_2$ batteries, Li—Ag$_2$CrO$_4$ batteries, Li-silver vanadium oxide (SVO) batteries; Li—CuO batteries, Li-copper oxyphosphate batteries, Li—CuS batteries, Li-PbCuS batteries, Li-iron batteries, Li-lead bismuthate batteries, Li—Bi$_2$O$_3$ batteries, Li-titanate batteries, Li—V$_2$O$_5$ batteries, Li—CoO$_2$ batteries, Li/Al—MnO$_2$ batteries, or Li/Al—V$_2$O$_5$ batteries. In particular, Li-ion, Li-ion polymer, and Li-air batteries can be useful as rechargeable batteries.

Lithium-ion batteries store energy chemically in the bulk of active materials through lithium intercalation/de-intercalation between two host structures. Conventional lithium-ion batteries can use lithium transition metal oxides (e.g., LiCoO$_2$, LiNiO$_2$, or LiMnO$_2$) or phosphate materials such as LiFePO$_4$ as the positive electrode and graphite as the negative electrode. Lithium intercalation allows high utilization of active material mass (up to one lithium stored per transition metal) and, therefore, high gravimetric energies, but the rate capability (power) is limited ultimately by the solid-state diffusion of lithium.

In contrast, ECs store charge on the surface of active materials through the formation of an electrical double layer capacitance or though Faradaic reactions (pseudocapacitance) near the surface. These processes are much faster compared to solid-state lithium diffusion, providing higher power capability than lithium-ion batteries. However, as they only utilize the surface of active materials, ECs have lower gravimetric energies. The use of pseudocapacitive materials in ECs can increase the gravimetric energies by utilizing reversible redox reactions in the near-surface regions.

Figure 1B:
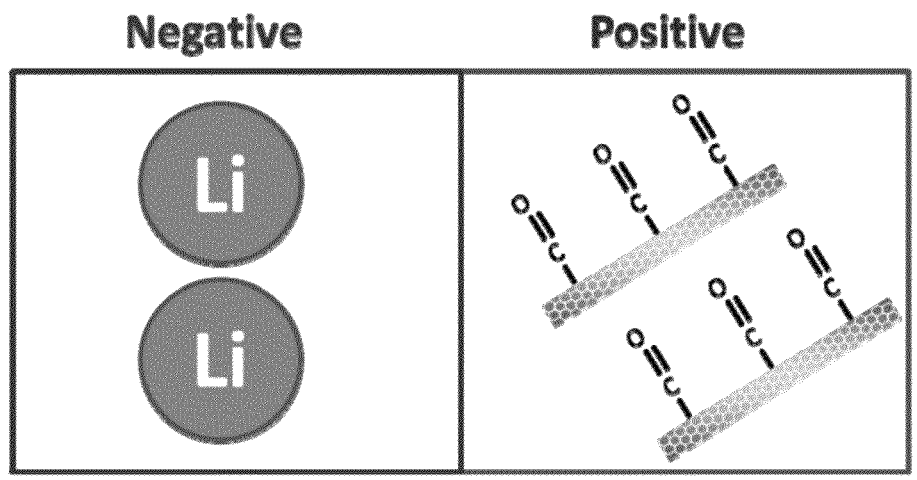
FIGS. 1b-1f schematically illustrate configurations of electrode materials suitable for use in an energy storage device.
Figure 1C:
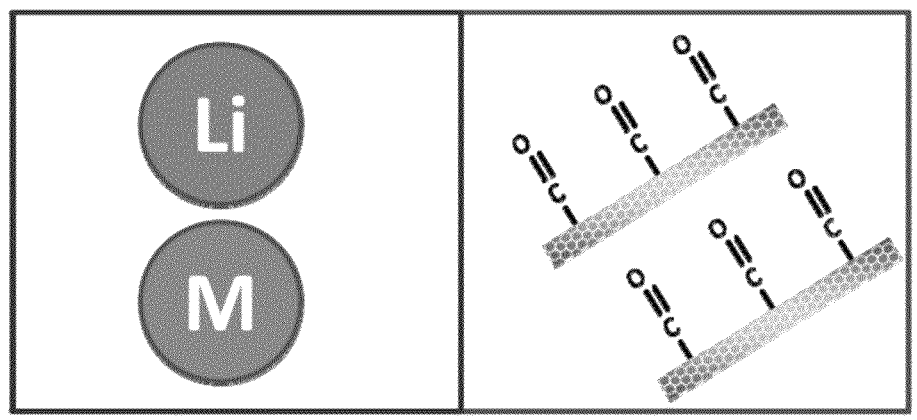
Figure 1D:
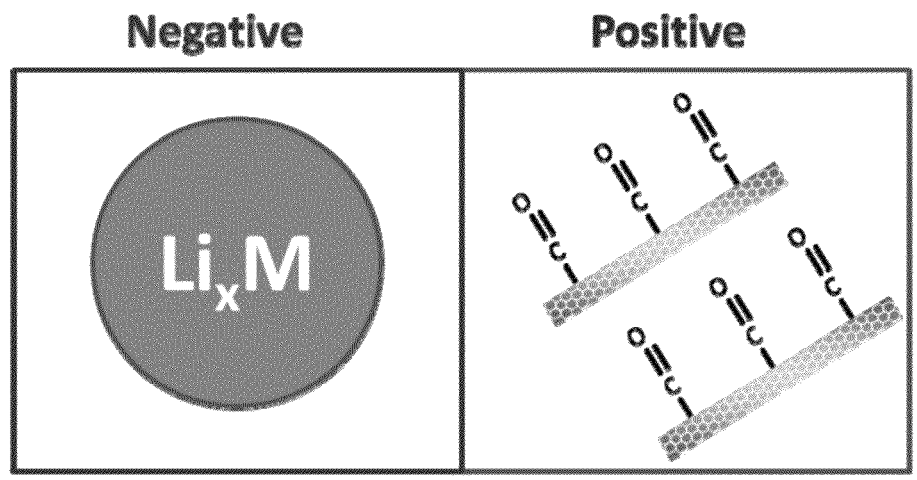
Figure 1E:
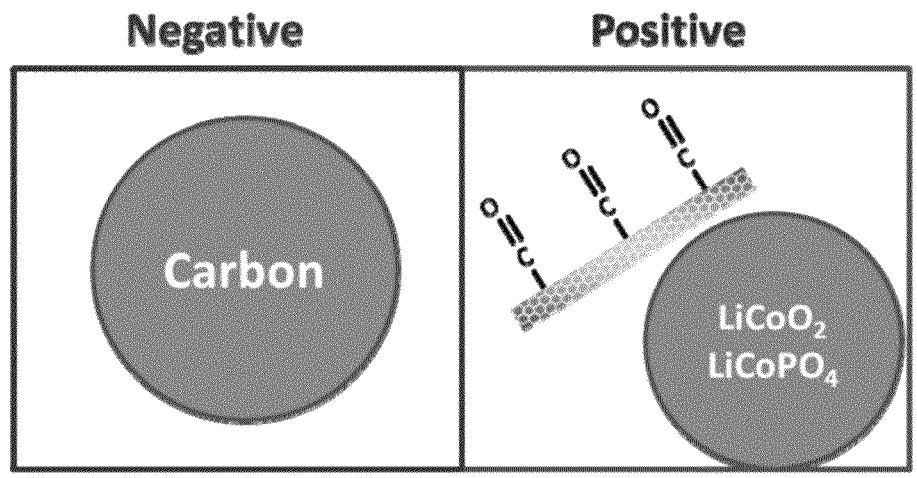
Figure 1F:
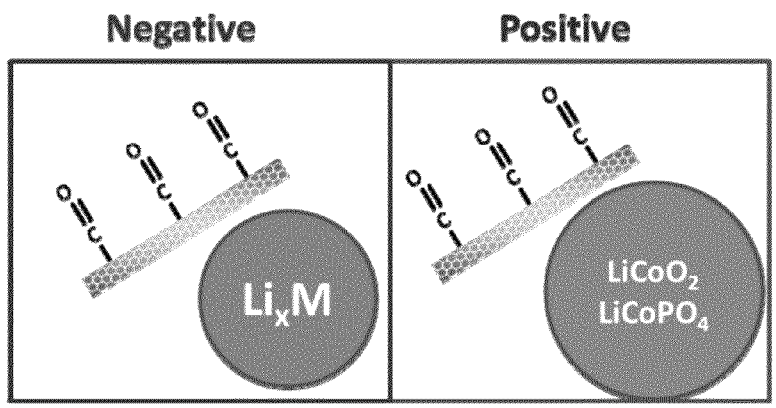

FIGS. 1b-1f show several configurations of electrode materials suitable for use in energy storage devices, e.g., rechargeable lithium batteries. In FIG. 1b, a metallic lithium negative electrode is paired with an oxygen-functionalized nanostructured carbon positive electrode. In FIG. 1c, the negative electrode includes lithium and one or more other metals or metal oxides; and is paired with an oxygen-functionalized nanostructured carbon positive electrode. In FIG. 1d, the negative electrode includes a lithiated carbon material, and is paired with an oxygen-functionalized nanostructured carbon positive electrode. In a similar configuration (not pictured), a negative electrode includes a metal oxide, and is paired with an oxygen-functionalized nanostructured carbon positive electrode. In Fig. 1e, a carbon negative electrode is paired with a positive electrode which includes oxygen-functionalized nanostructured carbon and a conventional lithium metal oxide, such as, for example, LiCoO$_2$, or other lithium metal inorganic compound such as a phosphate (e.g., LiFePO$_4$), a fluoride, a fluorophosphates, or fluorosulfate. In FIG. 1f, the negative electrode includes oxygen-functionalized nanostructured carbon and lithiated metal oxides, and the positive electrode includes oxygen-functionalized nanostructured carbon and conventional lithium metal oxides (e.g., LiCoO$_2$ or LiFePO$_4$).

The term "nanostructured carbon" includes electrically conductive carbon materials having extended networks of sp$^2$ hybridized carbon. Nanostructured carbon can take the form of, e.g., particles, rods, tubes, or the like, having a network of at least 5 aromatic rings of carbon atoms. Such fused-ring nanostructured carbon can include a larger fused network of rings, such as aromatic rings, for example a fused network of at least 10, at least 20, at least 30, at least 40, at least 50, or more, aromatic rings. The nanostructured carbon can be substantially planar or substantially non-planar, or can include a planar or non-planar portion. The carbon-based nanostructure can optionally have a border at which the fused network terminates. For example, a sheet of graphite has a border at which the fused network terminates, while a fullerene is a nonplanar nanostructured carbon which lacks such a border. In some cases, the border may be substituted, for example with hydrogen atoms or oxygen functional groups (e.g., —OH or —COOH). The term "fused network" might not include, for example, a biphenyl group, where two phenyl rings are joined by a single bond and are not fused. In some cases, the fused network may substantially comprise carbon atoms (and be substantially free of other atoms), or in other cases, the fused network may comprise carbon atoms and heteroatoms.

Examples of nanostructured carbon include fullerenic carbon (e.g., fullerenes and carbon nanotubes), graphenes, and polyacetylenes. Carbon nanotubes include, e.g., single-walled carbon nanotubes (SWNTs), few-walled carbon nanotubes (FWNTs), and multi-walled carbon nanotubes (MWNTs). The term "nanostructured carbon" also includes functionalized carbon materials, i.e., nanostructured carbon which includes various functional groups incorporated in or attached to the carbon framework. Such functional groups include, for example, oxygen functional groups such as —OH and —COOH. Thus, term "nanostructured carbon" includes oxygen-functionalized nanostructured carbon. Oxygen-functionalized nanostructured carbon includes materials such as, for example, oxidized FWNTs, oxidized MWNTs (including MWNT-COOH), graphene oxide (GO), reduced graphene oxide (rGO), and rGO—COOH.

The term "nanostructured" refers to articles having at least one cross-sectional dimension on the nanometer scale, e.g., less than about 1 μm, less than about 500 nm, less than about 250 nm, less than about 100 nm, less than about 75 nm, less than about 50 nm, less than about 25 nm, less than about 10 nm, or, in some cases, less than about 1 nm. Nanostructured carbon includes materials that have features on the nanometer scale in at least one, at least two, or in all three dimensions.

Oxygen-functionalized nanostructured carbon can in some cases be prepared by oxidation of pristine nanostructured carbon, i.e., nanostructured carbon in as-manufactured or purified forms. Oxidation of nanostructured carbon can include exposing the nanostructured carbon to oxidizing acids (e.g., a mixture of sulfuric and nitric acids) at a predetermined temperature for a predetermined time. Oxidation conditions (e.g., the nature and concentration of oxidants used, temperature, and time) can be controlled so as to provide a desired degree of oxidation of the nanostructured carbon. The degree of oxidation can be measured with reference to, for example, oxygen/carbon ratios in the material, which can be measured by, e.g., XPS.

Pristine nanostructured carbon can have an oxygen/carbon ratio of 0.1 or less, 0.05 or less, or 0.01 or less. Oxygen-functionalized nanostructured carbon can have an oxygen/carbon ratio greater than a corresponding pristine nanostructured carbon; for example, oxygen-functionalized nanostructured carbon can have an oxygen/carbon ratio of 0.05 or greater, 0.1 or greater, 0.2 or greater, or 0.3 or greater.

In some cases, a nanostructured carbon can be effectively pure carbon with no other atoms present (although it will be understood that in some cases a small degree of impurities can be present without altering the fundamental properties of the material). Thus, nanostructured carbon can consist essentially of carbon.

In some cases, nanostructured carbon can be effectively pure carbon and one or more other atoms, e.g., in a functionalized nanostructured carbon. Accordingly, nanostructured carbon (e.g., oxygen-functionalized nanostructured carbon) can be effectively pure carbon and oxygen with no other atoms present (although it will be understood that in some cases a small degree of impurities can be present without altering the fundamental properties of the material). Thus, nanostructured carbon (e.g., oxygen-functionalized nanostructured carbon) can consist essentially of carbon and oxygen.

Carbon-based electrodes are conventionally formed as an active material (and optional binders, additives, and other materials) on a substrate, such as a metallic current collector. The disadvantages of conventional electrode synthesis techniques, in which an electrode slurry is prepared by mixing active particles and binder in solvent and coating the slurry on the metal foil current collector, include the inability to control three-dimensional connectivity of active particles or tailor electrode porosity. In addition, conventional electrodes require polymer binder to hold particles together mechanically and ensure good electrical contact. This binder is insulating, adds inactive mass, and can cover the surface of electrode materials, which decreases the electrochemically active surface area.

Thus, self-supporting electrodes can provide various advantages over conventional electrodes. In other words, the electrode can be used without a substrate; it can have sufficient mechanical integrity to be handled and assembled in an energy storage device despite the lack of a substrate such as a metallic current collector. The lack of a metallic current collector provides a weight savings for the energy storage device. In some cases, the electrode can be initially formed on a substrate, then separated from the substrate before assembly in an energy storage device. A self-supporting electrode can be of sufficient thickness for use in practical energy storage devices. For example, a self-supporting electrode can have a thickness of less than 1 µm to hundreds of e.g., of 1 µm to 500 µm to 250 µm, 10 µm to 150 µm, or 20 to 100 µm.

The electrode can be free of binders or additives. In other words, the electrode can be formed only of active material, without binders, additives, or other materials added during manufacture, processing or assembly. The electrode can consist essentially of active material.

In some cases, an electrode can be simultaneously self-supporting and free of binders or additives. In some cases, an electrode can be simultaneously self-supporting, composed of nanostructured carbon (which can be functionalized nanostructured carbon), and free of binders or additives. Thus, a self-supporting electrode can consist essentially of carbon and oxygen. A self-supporting electrode can consist essentially of oxygen-functionalized nanostructured carbon, for example, oxygen-functionalized FWNTs, oxygen-functionalized MWNTs, graphene oxide, or a combination thereof. A self-supporting electrode can consist essentially of oxygen-functionalized nanostructured carbon and have a thickness of less than 1 µm to hundreds of 1 µm, e.g., of 1 µm to 500 µm to 250 µm, 10 µm to 150 or 20 to 100 µm.

An electrode can be prepared by a filtration process. An active material (and optional binders, additives, or other materials) can be dispersed in a solvent, and the solution passed through a filter having an appropriate pore size (e.g., 0.2 µm). The material(s) are retained on the filter while the solvent passes through. Filtration is optionally assisted, e.g., by applying a vacuum below the filter or applying pressure above the filter. The resulting deposit of materials on the filter can be the electrode. As discussed above, in some cases, the electrode can be self-supporting, in other words, the electrode can be separated from the filter and retain its mechanical integrity sufficient for further handling and assembly, e.g., in an energy storage device. Electrode size (e.g., diameter) can be selected by choosing appropriate filter size (e.g., diameter). Electrode thickness can be can be selected by choosing appropriate amounts of material to pass through the filter (e.g., concentrations and volumes of solution). In some cases, the electrode can be prepared by passing more than one different solution through the filter, to provide a composite electrode. The composite electrode can include a plurality of layers of materials; in some cases, a plurality of alternating layers of alternately-charged materials (as in LbL assembly; see, e.g., WO 2010/019272, which is incorporated by reference in its entirety).

Nanostructured carbon, as in the case of a carbon nanotube, can include an elongated chemical structure having a diameter on the order of nanometers and a length on the order of microns (e.g., tens of microns, hundreds of microns, etc.). Accordingly, a carbon nanotube can have an aspect ratio greater than 10, 100, 1000, 10,000, or greater. In some cases, the carbon nanotube can have a diameter less than 1 µm, less than 100 nm, 50 nm, less than 25 nm, less than 10 nm, or, in some cases, less than 1 nm.

FWNTs, for example, can include from 2 to tens of concentric nanotubes, e.g., from 2 to 10 concentric nanotubes. FWNTs can have diameters of, e.g., less than 5 nm to tens of nm, e.g. 5 nm to 20 nm, or 5 nm to 10 nm. FWNTs can have lengths in the range of, e.g., 100 nm or less to hundreds of micrometers or more. In some cases, FWNTs have lengths in the submillimeter regime, i.e., approximately 100 µm to 1,000 µm. Accordingly, FWNTs can in some cases have aspect ratios from approximately 10,000 to 500,000 or greater, e.g., between approximately 10,000 and approximately 250,000, or between approximately 20,000 and approximately 100,000.

The electrodes and devices described here can achieve one or more performance metrics. For example, a component (e.g., one or more electrodes) of a device capable of achieving one or more performance metrics (e.g., a pre-determined capacitance, energy density, specific energy, power, charge efficiency, discharge efficiency, etc., or a combination of any of these in coordination with each other) can include nanostructured carbon. A device including an electrode including nanostructured carbon can show capacitance or pseudocapacitance; e.g., achieve a volumetric capacitance at the electrode of at least about 100, at least about 200, at least about 300, at least about 400, or at least about 450 Farads per cubic centimeter of the electrode; or a gravimetric capacitance of at least about 100, at least about 200, at least about 300, at least about 400, at least about 500, or at least about 550 Farads per gram of the electrode. As another example, in some instances, a device including an electrode including nanostructured carbon can achieve volumetric energy densities of at least about 100, at least about 250, at least about 400, at least about 500, at least about 600, at least about 700, or at least about 750 Watt-hours per liter of the electrode. In some cases, the device can achieve a specific energy at the electrode of at least about 100, at least about 250, at least about 500, at least about 600, at least about 700, at least about 800, at least about 850, or at least about 900 Watt-hours per kilogram of the electrode.

When measured with respect to the device as a whole, a device including an electrode including nanostructured carbon can achieve a volumetric capacitance at the electrode of at least about 50, at least about 75, at least about 100, at least about 125, or at least about 150 Farads per cubic centimeter of the device; or a gravimetric capacitance of at least about 50, at least about 75, at least about 100, at least about 125, at least about 160, or at least about 185 Farads per gram of the device. With respect to the device as a whole, the device can achieve a volumetric energy density of at least about 125, at least about 150, at least about 200, at least about 225, or at least about 250 Watt-hours per liter of the device; or a gravimetric energy density of at least about 20, at least about 50, at least about 100, at least about 175, at least about 200, at least about 225, at least about 250, at least about 275, or at least about 300 Watt-hours per kilogram of the device. Those skilled in the art will understand what components are to be included in the volume or mass of the device as described above. Device volumes and masses described herein may include, in some embodiments, the volume or mass of a working electrolytic cell, a working electrochemical cell, a working capacitor, etc. As a non-limiting example, in the case of an electrochemical cell, the volume or mass of the device may include the volumes or masses of the electrode, the counter electrode, the electrolyte, and the device package. Examples of components that might not be included in the volume or mass of a device include, but are not limited to, wiring outside the device package, components outside the package used to house the device, etc.

A device including an electrode including nanostructured carbon can exhibit fast charge and/or discharge rates. For example, a device can be charged to a predetermined capacity (e.g., at least about 50%, at least about 75%, at least about 90%, at least about 95%, or at least about 99%) within about 1 second, within about 10 seconds, within about 30 seconds, within about 1 minute, within about 5 minutes, within about 10 minutes, within about 30 minutes, within about 1 hour, within about 2 hours, or within about 6 hours. The device can discharge a predetermined percentage of its capacity (e.g., at least about 50%, at least about 75%, at least about 90%, at least about 95%, at least or about 99%) within about 1 second, within about 10 seconds, within about 30 seconds, within about 1 minute, within about 5 minutes, within about 10 minutes, within about 30 minutes, within about 1 hour, or within about 2 hours.

A device as described here can in some case provide high power outputs, e.g., at least about 100 W per kilogram of the electrode, at least about 1 kW per kilogram of the electrode, at least about 10 kW per kilogram of the electrode, at least about 30 kW per kilogram of the electrode, at least about 300 kW per kilogram of the electrode, or more. In volumetric terms, the device can provide power at the electrode at a rate of at least about 80 W per liter of electrode, at least about 800 W per liter of electrode, at least about 8 kW per liter of electrode, at least about 25 kW per liter of electrode, 250 kW per liter of electrode, or more. Devices comprising carbon-based nanostructures can provide the power outputs described above in coordination with any of the performance metrics and/or material properties associated with assemblies, compositions, and devices described herein. In particular, an energy storage device as described here can simultaneously provide an energy density on the order of hundreds of $Wh/kg_{electrode}$ (e.g. 100 or more, 100 to 1,000, or 200 to 500 $Wh/kg_{electrode}$) with a power output on the order of tens of $kW/kg_{electrode}$ (e.g., 1 or more, 5 or more, 10 or more, or 50 or more $kW/kg_{electrode}$).

In some embodiments the amount of energy lost (e.g., as lost heat) during charge and/or discharge of a device can be relatively low, e.g., the device can convert at least about 60%, at least about 70%, at least about 75%, or at least about 80% of the energy input to the device during charging to stored energy within the device after charging; when discharging, the device convert to electricity at least about 60%, at least about 70%, at least about 75%, or at least about 80% of the energy stored after charging.

In some embodiments, low amounts of energy may be lost during charge and/or discharge of the devices at high rates. For example, a device can convert at least about 60%, at least about 70%, at least about 75%, or at least about 80% of the energy input to and/or stored within the device while the device is charged and/or discharged at any of the rates described above. A device can convert these percentages of energy while the device provides power at any of the rates (e.g., per unit mass or volume of electrode) outlined above. In some cases, devices can exhibit low energy losses during charge and/or discharge in coordination with any of the performance metrics and/or material properties associated with assemblies, compositions, and devices described herein.

In some embodiments, a device can exhibit consistent performance (e.g., capacitance, energy density, and/or specific energy) after repeated cycling. For example, after 10 or more, 100 or more, or 1,000 or more cycles, the device may exhibit a capacitance, energy density, and/or specific energy of at least about 50%, at least about 65%, at least about 80%, at least about 90%, at least about 95%, or at least about 99% of the device's initial capacitance, energy density, and/or specific energy at the end of the cycles.

EXAMPLES

Example 1

Sub-millimeter-long FWNTs[1] (6-10 nm diameter, 0.4 mm length, 99 wt. % purity, 400 $m^2/g$ SSA, triple-walled on average) were synthesized by CVD in a single fluidized bed reactor. MWNTs prepared by a conventional CVD method were purchased from NANOLAB (95% purity, length 1-5 μm, outer diameter 15±5 nm). CNTs were refluxed in concentrated $H_2SO_4/HNO_3$ (3/1 v/v, 96% and 70%, respectively) at 70° C. to introduce oxygen function groups on the surface of CNTs.[2] Oxidation time was controlled from 2 to 6 hours to control the amount of oxygen functional groups on CNTs. CNTs in $H_2SO_4/HNO_3$ was diluted in 5 vol % HCl solution (1 L) after the oxidation process, and filtered via a polycarbonate membrane filter (Whatman membrane, 0.05 μm pore size). Remaining CNT powders on the filter were washed with deionized Milli-Q water (18 MΩ.cm) water (3 L). Pristine CNTs were dispersed in ethanol, and oxidized (2-hour and 6-hour) CNTs were dispersed in Milli-Q deionized water at a concentration of 0.5 mg/mL with unadjusted pH, and were sonicated for 15-30 minutes to improve the quality of dispersion. Electrodes which were binder-free and additive-free were synthesized by the vacuum-filtration (VF) method onto Whatman polycarbonate track-etched membranes (0.2 μm pore diameter), which resulted in interwoven and mechanically robust CNT films attached to the membrane. Free-standing electrodes were obtained by removing the air-dried CNT films using a razor blade, and electrodes were further dried overnight (70° C.) in air, then cut or punched to the desired size. The typical thickness of VF-CNT electrodes was 15-75 μm, depending on the initial volume of CNT dispersion used for filtration. The processing steps are summarized schematically in FIGS. 4a-4d.

Figure 2:
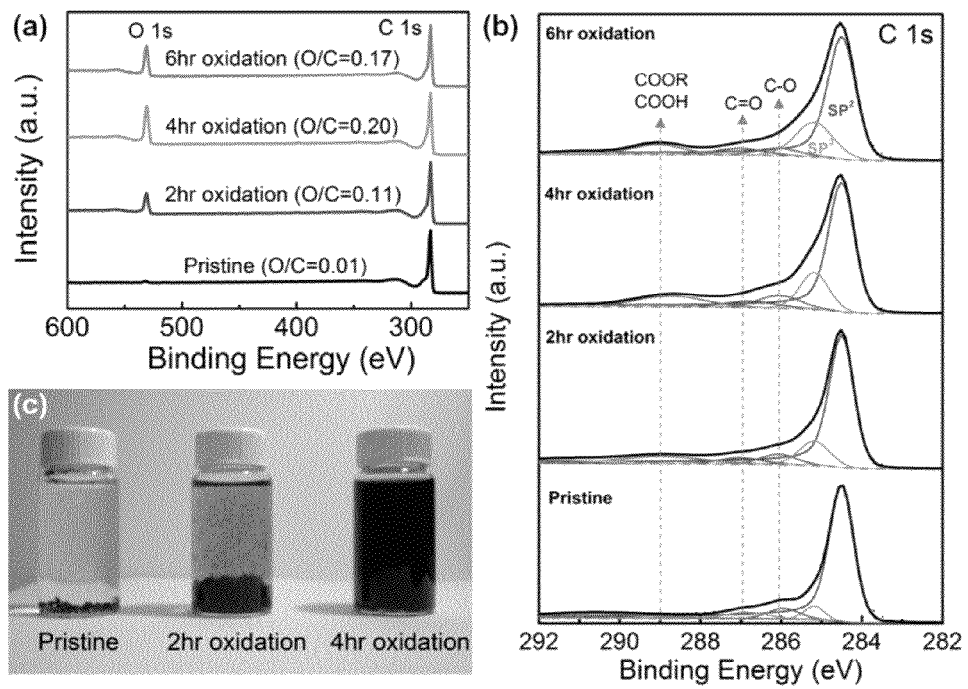
FIG. 2a shows an X-ray photoelectron spectroscopy (XPS) wide scan survey of pristine and oxidized few-walled carbon nanotubes (FWNTs). The label O/C indicates atomic ratio of oxygen to carbon.
FIG. 2b shows C 1s XPS spectra of pristine and oxidized FWNTs.
FIG. 2c shows FWNT solutions, oxidized to varying degrees, 30 min after completion of sonication.

The degree of oxygen functionalization of CNTs was quantified using XPS. An XPS wide scan survey showed that O 1 s peaks increased relative to C 1s peaks with longer oxidation times up to 4 hours, and maintained similar ratios from 4 hours to 6 hours (FIG. 2a). Atomic ratios of oxygen to carbon (O/C) of FWNTs (obtained from high-resolution C1s and O1s peaks) were found to increase from 0.11 (2-hour oxidation) to 0.20 (4-hour oxidation), indicating that the oxidation time controlled incorporation of oxygen functional groups on FWNTs. High-resolution C1s XPS spectra tracked detailed changes in surface chemistry of FWNTs during the oxidation process (FIG. 2b). Pristine FWNT C1s peaks showed mostly $sp^2$ hybridized graphitic carbons centered at 284.5 eV and included small contents of $sp^3$ hybridized diamond-like carbon centered at 285.2 eV (FIG. 2b).[1,2] As the oxidation time was increased, the intensities of carbon atom peaks connected to oxygen atoms (C—O centered at 286.0±0.1 eV, C=O centered at 286.9±0.2 eV, COOH(COOR) centered at 288.9±0.2 eV)[2,3] as well as $sp^3$ hybridized carbon peaks also increased. This indicated that the oxidation process gradually broke the exterior graphitic wall of FWNTs and incorporated oxygen functional groups (FIG. 2b). Carboxylic acid (—COOH) groups introduced on the surface of FWNTs can be primarily in the carboxylate form (—COO⁻) in aqueous solution, which can prevent aggregation and precipitation of CNTs.[1]

FIG. 2c compares the dispersion of FWNTs in deionized water (0.5 mg/ml) after 30 min following a sonication period of 15 minutes. Pristine FWNTs precipitated immediately after sonication, but FWNTs that had been oxidized for 4 hours maintained a stable dispersion, showing that electrostatic repulsions between anions (—COO⁻) on FWNTs overcame van der Waals interactions among FWNTs. The 2-hour oxidized FWNTs showed moderate dispersion quality and precipitated gradually after the sonication process. The 2-hour oxidized MWNTs (10~20 nm, 1~5 μm length)[1,4] had similar oxygen content (O/C=0.11) to the 2-hour oxidized FWNTs, but these MWNTs showed a stable dispersion in water. This difference of dispersion could be attributed to different aspect ratios (~50,000 for FWNTs here[5] vs. ~167 for MWNTs[1,4]). High resolution transmission electron microscopy (HRTEM) measurements showed that pristine FWNTs had smooth outer surfaces (FIG. 3a), but the oxidation process gradually roughened the exterior walls of FWNTs with longer oxidation time (FIGS. 3b-3c). This was in good agreement with the XPS results showing that more $sp^3$ carbons and oxygenated species were detected on FWNTs as the oxidation time increased. Note that thin FWNTs (FIG. 3a) became less visible in HRTEM with longer oxidation time and therefore only larger FWNTs were observed, as shown in FIGS. 3b-3c.

Figure 5:
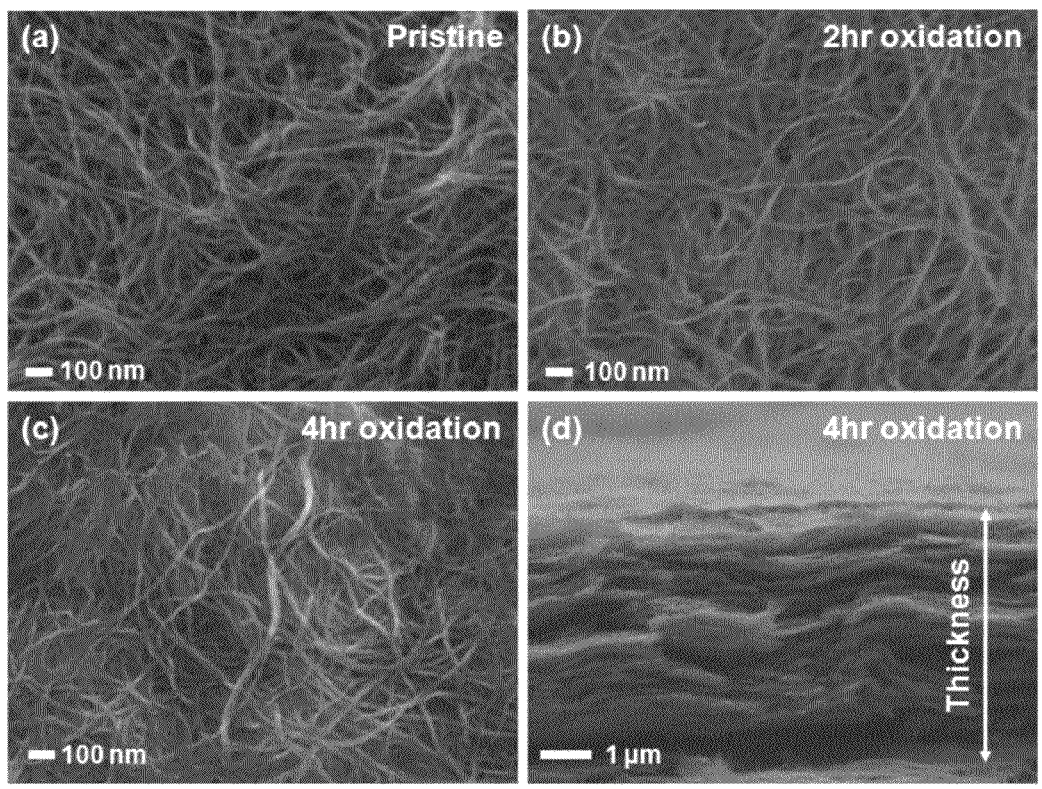
FIGS. 5a-5d are scanning electron microscopy (SEM) top view images of electrodes prepared by vacuum filtration of pristine (FIG. 5a), 2-hr oxidized (FIG. 5b), and 4-hr oxidized (FIG. 5c) FWNT solutions.

Pristine and oxidized FWNTs were dispersed in ethanol and deionized water, respectively, then assembled via the VF method, yielding films of interwoven FWNTs that could be removed from the membrane to create free-standing VF-FWNT electrodes. The origin of mechanical stability of free standing electrodes can be attributed to the highly interpenetrating network structure of high aspect ratio FWNTs, which was revealed by SEM images of VF-FWNT electrodes (FIG. 5). A cross-sectional SEM image of a free-standing electrode from 4-hour oxidized FWNTs clearly showed that the individual FWNTs assume random orientations within the film (FIG. 5d). It some cases mechanical brittleness created difficulties in detaching thin (<~5 μm) VF-FWNT electrodes from the membranes. Thicker electrodes showed higher mechanical strength. Densities of free-standing electrodes were ~0.2 $g/cm^3$ for pristine FWNTs, ~0.4 $g/cm^3$ for 2 hr- or 4 hr- oxidized FWNTs, and ~0.8 $g/cm^3$ for 6 hr-oxidized FWNTs, indicating that oxidized FWNTs created a more densely-packed structure owing to good dispersion of FWNTs in water. Similarly, oxidized MWNTs were assembled to self-standing electrodes by VF (VF-MWNT electrodes, FIG. 4d) to compare electrochemical performance with VF-FWNT electrodes.

Figure 6:
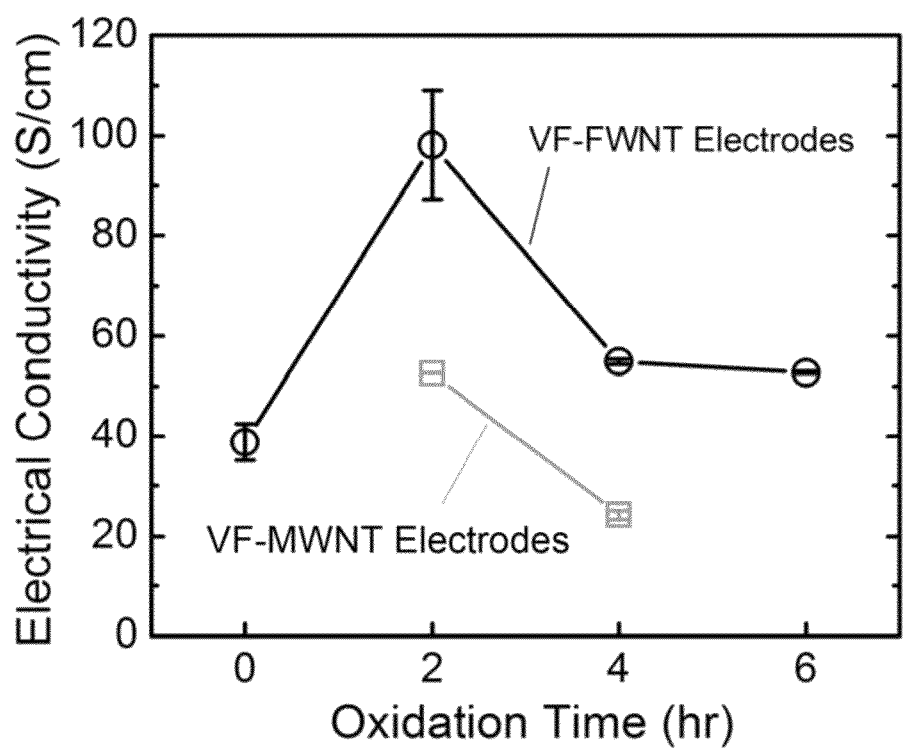
FIG. 6 is a graph showing electrical conductivities of VF-FWNT and VF-MWNT electrodes as a function of the oxidation time.

The electrical conductivities of VF-FWNT and VF-MWNT electrodes were measured by a 4-point probe (FIG. 6). The electrical conductivity of VF-FWNT electrode increased from ~40 S/cm with pristine FWNTs to ~100 S/cm with 2 hr-oxidized FWNTs, and decreased to ~50 S/cm with 4 hr~6 hr oxidized FWNTs. Without intending to be bound by a particular mechanism, the increased conductivity for 2 hr-oxidized VF-FWNT electrodes was attributed to higher packing density giving more continuous pathways for fast electron transport. The decrease seen for 4 hr~6 hr oxidized VF-FWNT electrodes can be related to the disruption of the conjugated carbon $sp^2$ orbitals on the FWNT walls with the incorporation of surface functional groups.

All the VF-FWNT electrodes had much higher electronic conductivities compared to the approximately 20-50 S/cm measured for VF-MWNT electrodes. This difference can be explained by the high aspect ratio and length of FWNTs compared to MWNTs (here, FWNTs: 0.4 mm length, aspect ratio on the order of 50,000; MWNTs: 1-5 μm length, aspect ratio on the order of 167). With a higher aspect ratio and length the VF-FWNT electrodes can provide more continuous pathways for electron transport than in VF-MWNT electrodes.

Figure 7:
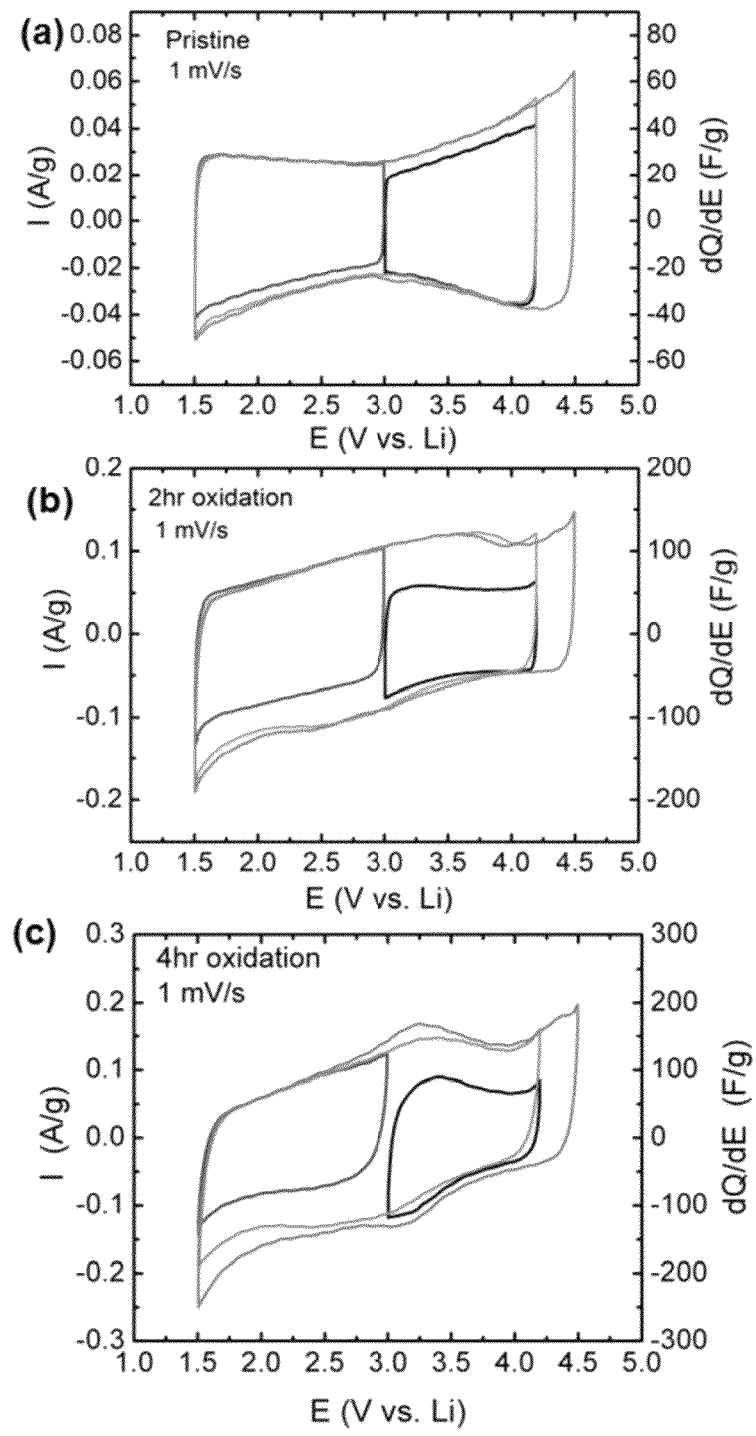
FIGS. 7a-7c show results of potential-dependent cyclic voltammetry and differential capacitance of VF-FWNT electrodes in lithium cells for electrodes prepared with pristine (FIG. 7a), 2-hour oxidized (FIGS. 7b), and 4-hour oxidized (FIG. 7c) VF-FWNT electrodes. The examined potential windows were 3.0-4.2 V vs. Li, 1.5-3.0 V vs. Li, 1.5-4.2 V vs. Li, and 1.5-4.5 V vs. Li at a scan rate of 1 mV/s. The thicknesses of the FWNT electrodes were 55 µm for pristine FWNT, 22 µm for 2 hr oxidized FWNT, 15 µm for 4 hr oxidized FWNT electrodes.

Electrochemical testing of VF-FWNT electrodes in lithium cells showed that FWNT electrode performance was strongly influenced by oxidation time and corresponding oxygen content of FWNTs. Cyclic voltammetry at 1 mV/s of pristine VF-FWNTs (FIG. 7a) exhibited characteristic double-layer charging, with an average capacitance corresponding to 33 F/g (1.5 to 4.5 V vs. Li) for both the forward and backward scans, which was measured by dividing the gravimetric current by the scan rate. The pristine VF-FWNT capacitance was found to be largely independent of the voltage scan range, yielding nearly overlapping curves over several different scan windows. In contrast, oxidized VF-FWNTs exhibited substantially higher gravimetric currents and capacitances compared to pristine VF-FWNTs, as shown in FIGS. 7b and 7c. The 2-hour oxidized VF-FWNTs exhibited an average capacitance of 94 F/g for the forward scan and 90 F/g for the backward scan (1.5-4.5 V vs. Li), while the 4-hour samples had capacitances of 120 and 116 F/g, respectively. Additionally, the currents measured from oxidized VF-FWNTs were found to be highly potential-dependent. In the voltage range of 3.0-4.2 V vs. Li, the average forward-scan capacitance of 2-hour VF-FWNTs was 50 F/g, while that of the 4-hour VF-FWNTs was 67 F/g. Similar trends were observed when the voltage window was limited to 1.5-3.0 V vs. Li.

When the sweep range was widened to 1.5-4.2 V vs. Li, the capacitance in the range 3.0-4.2 V vs. Li increased substantially on the forward scan, yielding average capacitances of 113 and 151 F/g, respectively. The potential-dependent gravimetric currents obtained from a 6-hour oxidized electrode were comparable to that of the 4-hour sample, consistent with their similar oxygen-to-carbon ratios (see FIG. 2a). The potential-dependent capacitance obtained from functionalized FWNTs indicates that additional charge storage mechanisms are accessible during the first discharge below 3.0 V vs. Li and subsequent charging above 3.0 V vs. Li, which have previously been attributed to Faradaic reactions with oxygen functional groups, such as carboxylic acid and carbonyl groups, on FWNTs.[4] The contribution of Faradaic reactions, which are potential-dependent, were also seen by comparing the cyclic voltammetry peak shapes: a clear set of peaks centered around ~3.2 V vs. Li emerged with increasing oxidation time.

Figure 3:
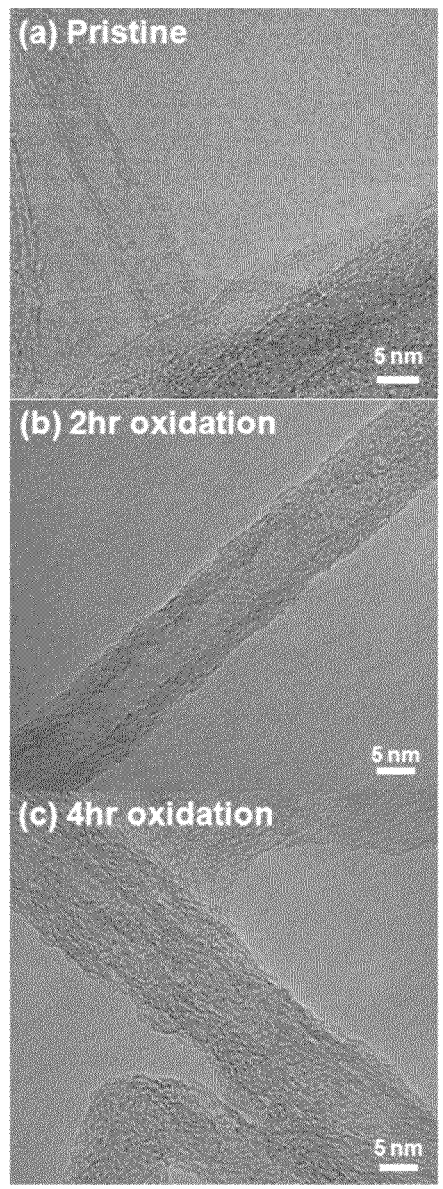
FIGS. 3a, 3b, and 3c are transmission electron microscopy (TEM) images of pristine FWNTs, 2-hr oxidized FWNTs, and 4-hr oxidized FWNTs, respectively.
Figure 4:
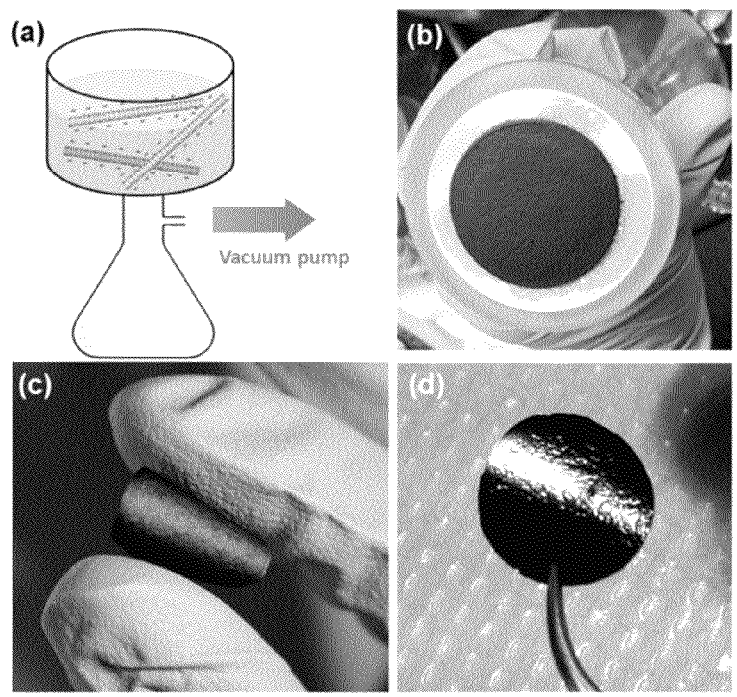
FIG. 4a is a schematic illustration of a vacuum filtration (VF) process for forming electrodes with oxidized carbon nanotubes.
FIGS. 4b, 4c, and 4d are images of deposited FWNTs on a PC membrane after VF process, a folded FWNT electrode assembled via VF (2-hr oxidized FWNTs), and a self-supporting MWNT electrode assembled via VF (4-hr oxidized MWNTs), respectively.
Figure 8:
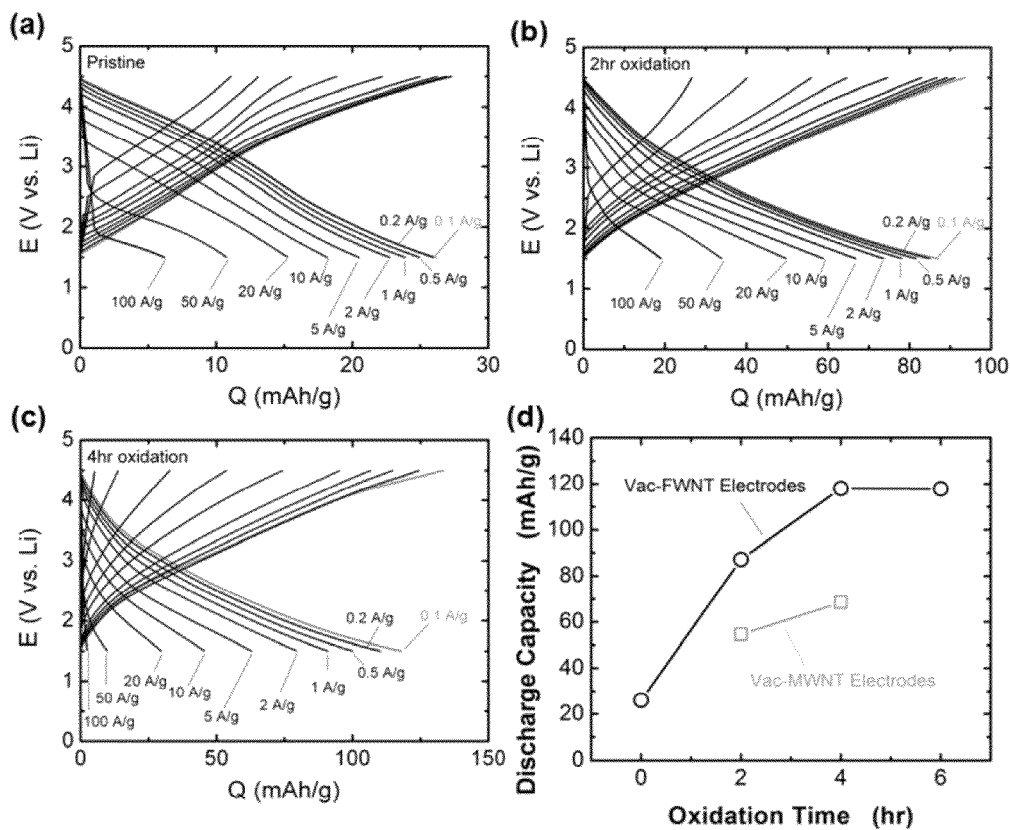
FIGS. 8a-8d show galvanostatic rate capability of VF-FWNT electrodes in lithium cells for pristine (FIG. 8a), 2-hour oxidized (FIGS. 8b), and 4-hour oxidized VF-FWNT electrodes (FIG. 8c). The voltage window was 1.5-4.5 V vs. Li and the gravimetric currents ranged from 0.1 A/g-100 A/g. Preceding charge or discharge, the cells were held at a constant voltage of 4.5 or 1.5 V vs. Li, respectively, for 30 minutes.

Galvanostatic testing of VF-FWNT electrodes in the range 1.5-4.5 V vs. Li (FIGS. 8a-8c) indicated that the maximum obtainable capacity at low rate (<1 A/g) was substantially higher for oxidized VF-FWNT electrodes and increased with increasing oxidation time. Pristine electrodes delivered a capacity of 26 mAh/g at 0.1 A/g, whereas 2-hour and 4-hour functionalized electrodes had capacities of 87 and 118 mAh/g, respectively (FIG. 8d). At low rates, the slight advantage in capacity observed for the 4-hour VF-FWNT electrodes could be related to a larger amount of oxygen functional groups on the carbon surface resulting from longer oxidation time. With increasing rate, both the pristine and 2-hour VF-FWNT electrodes exhibited a gradual decline in capacity up to 20 A/g, after which capacity declined more rapidly. However, the capacities of 4-hour VF-FWNT electrodes were more highly rate-sensitive. While the low-rate performance of 2-hour and 4-hour electrodes was comparable, 4-hour VF-FWNT electrodes delivered only 9 mAhlg at 50 A/g, compared to 34 mAh/g for 2-hour VF-FWNT electrodes. The rapid decline of performance of 4-hour functionalized samples could be related to poor electric conductivity resulting from the introduction of a large number of defect sites on the FWNTs during the oxidation process, and which can be related to the enhanced solubility of FWNTs in water (FIG. 2c) and the substantial roughening of FWNTs with oxidation time that was observed from TEM (FIG. 3). Galvanostatic performance of 6-hour functionalized FWNTs was found to be comparable to that of the 4-hour FWNTs, and the discharge gravimetric capacities obtained at 0.1 A/g were found to be comparable (FIG. 8d) for 4-hour and 6-hour oxidation times, indicating that no further advantage in discharge capacity is obtained with oxidation time beyond 4 hours. The VF-FWNT electrodes had much higher discharge capacities compared to those of VF-MWNT electrodes with the same oxidation time (FIG. 8d).

Figure 9:
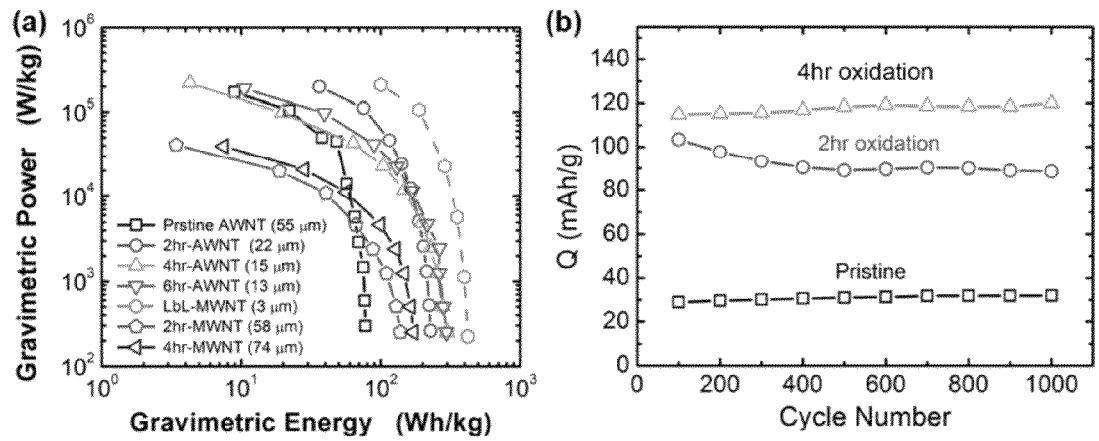
FIG. 9a is a Ragone plot comparing energy and power performance of VF-FWNT, VF-MWNT and LbL-MWNT electrodes. Only positive electrode weight was considered in the gravimetric energy and power density calculations.
FIG. 9b shows cycling performance of VF-FWNT electrodes tested galvanostatically in the voltage range of 1.5-4.5 V vs. Li. The data points correspond to discharge capacity obtained at a gravimetric current of 0.1 A/g following voltage hold at 4.5 V vs. Li for 30 minutes. Between data points, the cells were cycled at an accelerated gravimetric current of 10 A/g for 99 cycles.

The rate sensitivity of the three samples were clearly seen from a Ragone Plot (FIG. 9a) comparing total energy and average power of CNT electrodes. At low power of approximately 300 W/kg, both the 2-hour and 4-hour VF-FWNT electrodes delivered energies of ~250 Wh/kg up to powers of ~1 kW/kg, after which a substantial decrease in attainable energy occurred with increasing power, with the most severe decline occurring for the 4-hour VF-FWNT electrodes. FWNTs oxidized for 6 hours exhibited similar oxygen content as the 4-hour CNTs, as determined from XPS (FIG. 2), and comparable energy-power characteristics (FIG. 8d) throughout the entire range examined, which indicated that oxygen incorporation was saturated after 4 hours of oxidation time. In contrast, the maximum attainable energy for pristine VF-FWNT electrodes was found to be 78 Wh/kg at a comparable low power. The lower gravimetric energy of pristine VF-FWNT electrodes compared to oxidized VF-FWNT electrodes indicated that Faradaic reactions between lithium ions and functional groups contributed substantially to the energy storage capability of FWNT electrodes. This mechanistic understanding was further supported by electrochemical impedance spectroscopy (EIS) results (FIGS. 10 and 11) which indicated different behaviors for the pristine and functionalized FWNTs. In particular, a 2-hour functionalized electrode exhibited a substantially larger semi-circle at mid-high frequencies compared to the pristine VF-FWNT electrodes, which could be related to the presence of oxygen groups that contribute a higher Faradaic resistance compared to pristine VF-FWNT electrodes (all EC electrodes exhibit some finite Faradaic leakage resistance[6]). The Faradaic resistance increased further for the 4-hour functionalized VF-FWNT electrodes (FIG. 11), consistent with the trend of increasing oxygen content. Additionally, the oxidized VF-FWNT electrodes exhibited a 45° feature between the frequencies 100-0.1 Hz (FIGS. 10 and 11) that was not present in the pristine VF-FWNT electrodes, and which could be related to diffusion limitations of lithium ions to find oxygen sites on the carbon surface. In addition, FIG. 9a showed that VF-FWNT electrodes delivered much higher energy and power compared to those of VF-MWNT electrodes, believed to be due to more efficient utilization of oxygen functional groups and higher electrical conductivity, suggesting FWNTs more superior carbon support than MWNTs for lithium-storage applications.

Example 2

MWNT-COOH synthesis. Functionalization of MWNT was performed using a previously reported method.[1,8] Briefly, MWNT-COOH was prepared by oxidizing pristine MWNTs (95% purity, 400 m$^2$ g$^{-1}$, NANOLAB) in a mixture of H$_2$SO$_4$ (96.5%, J. T. Baker) and HNO$_3$ (70%, Mallinckrodt Chemicals) solution (3:1 v/v) at 70° C. for 2 h. The MWNT-COOH was washed in 5% of HCl solution and dried in air. The dried MWNT-COOH was dispersed in DI water by stirring and sonication (1 mg mL$^{-1}$).

Graphene Oxide (GO) synthesis. GO solution was made using a modified Hummers method.[9-11] Briefly, 1 g of raw graphite powder (SP-1, Bay Carbon), 0.5 g of K$_2$S$_2$O$_8$ (Fluka), and 0.5 g of P$_2$O$_5$ (Fluka) were stirred in 3 mL of H$_2$SO$_4$ at 80° C. for 4.5 h and copiously washed and dried in air overnight. Then 3 g of KMnO$_4$ (Sigma-Aldrich) was slowly added to the graphite powder solution with 23 mL of H$_2$SO$_4$ at 0° C. After vigorous stirring at 36° C. for 2 h, 46 mL of deionized water (DI water, R ~18.2 MI) was added at 0° C. and the solution was stirred at 36° C. for additional 2 h. The oxidation step was completed by the addition of 140 mL of the DI water and 2.5 mL of H$_2$O$_2$ solution (35%). The GO solution (brown color) was washed, and filtrated with 250 mL of HCl (10%). Before complete drying, the GO was dispersed in of DI water (10 mg mL$^{-1}$) and dialyzed for 2 weeks, from which pH values attained 4~6.

Assembly of MWNT-COOH/GO. The dialyzed GO solution (10 mg mL$^{-1}$) and MWNT-COOH (1 mg mL$^{-1}$) solutions were mixed with 1:9 (v/v) ratio and sonicated at 100 W for 1 h and stirred for 1 h. The mixture was well dispersed in DI water over 3 days without any precipitation or aggregation. The mixture solution was vacuum-filtrated using a filtration membrane with 0.5 μm pore size and 47 or 90 mm diameter (PC, Whatman®). To make ~6, 70, and 250 μm MWNT-COOH/GO films, approximately 30, 110, and 250 mL of MWNT-COOH/GO solution was used, respectively, indicating that the thickness and density of films can be controlled by varying the filtration volume. Following filtration, the air-dried MWNT-COOH/GO film was peeled off from the filtration membrane and dried in a convection oven at 60° C. for 24 h.

Distinction between MWNT-COOH/GO, MWNT-COOH/rGO—COOH, MWNT-rGO: For the preparation of MWNT-COOH/rGO—COOH and MWNT/rGO electrodes, in which the graphene oxide was converted to reduced graphene oxide (rGO), as-prepared MWNT-COOH/GO film was heat-treated at 200 or 900° C., respectively, for 2 h at 10° C. min$^{-1}$ ramp rate and under 20 cc min$^{-1}$ of H$_2$/Ar (4/96%) gas flow, then cooled down to room temperature (Table 1). The sample names were chosen to reflect the predominant surface chemistry of the carbon electrode before or after heat treatments as determined by X-Ray Photoelectron Spectroscopy (XPS), described in detail below.

TABLE 1

| Sample Name | Heat treatment gas | Heat treatment temperature |
| --- | --- | --- |
| MWNT-COOH/GO | none - pristine | none - pristine |
| MWNT-COOH/rGO-COOH | 4% H$_2$/96% Ar | 200° C. |
| MWNT/rGO | 4% H$_2$/96% Ar | 900° C. |

Film characterization. The cross-sectional views of all films were investigated using SEM (JEOL 6700) after sputtering the films with Au/Pd (~1 nm). Chemical identification of films was addressed by XPS using a Kratos AXIS ultra imaging monochromatic Al anode. All spectra were calibrated by setting the C is photoemission peak for $sp^2$-hybridized carbons to 284.5 eV, and were fitted after a Shirley type background subtraction. Sheet-resistance was measured by a 4-point probe (Signatone S-302-4) with a device analyzer (Keithley 4200).

Electrochemical testing. Electrochemical cells (Tomcell, Japan) were prepared with a lithium metal negative electrode, two microporous separators (Celgard 2500, 25 μm each) wetted with 1 M $LiPF_6$ in EC:DMC (3:7 v/v) electrolyte (140 μL total), and a MWNT-graphene positive electrode (15 mm diameter). The film thickness was measured by a Digimatic Micrometer (Mettler Toledo) in three different locations on the film and mass was obtained by balance (Mettler Toledo). Cyclic voltammetry, galvanostatic, and cycling tests were conducted in the voltage range 1.5-4.5 V vs. Li. For cells tested under galvanostatic conditions, the voltage was held constant at 1.5 V or 4.5 V for 1 hour prior to charge or discharge, respectively. In all cases, values normalized on a per-gram basis consider the weight of active material in the positive electrode only.

Figure 12:
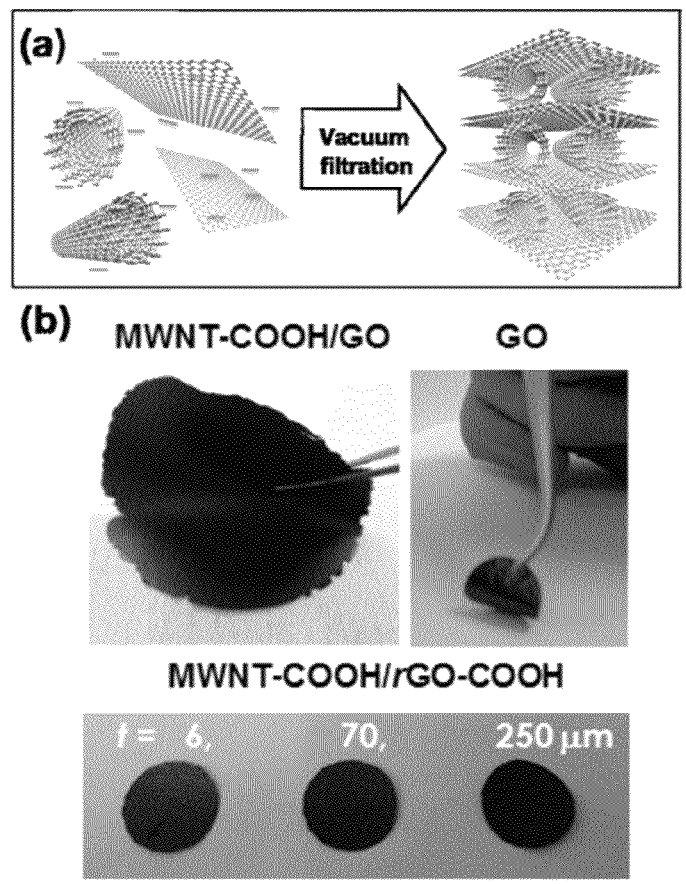
FIG. 12a is a schematic illustration of vacuum-filtration process of oxidized MWNTs and GO.
FIG. 12b shows images of (top left) MWNT-COOH/GO film (9:1 v/v %), (top right) a GO electrode, and (bottom) MWNT-COOH/rGO—COOH electrodes for different film thicknesses. All electrodes shown are following vacuum filtration, drying, and removal from the PC membrane.

Hierarchical structures of MWNT-COOH/GO were achieved through vacuum filtration of the solution mixture (FIG. 12a). Optical images of the resulting films are shown in FIG. 12b, where free standing films with diameters ranging from ~20 mm to 90 mm were attained by varying the filter diameter. Self-supporting films with thicknesses ranging from approximately 3 μm to 250 μm were obtained using this process (FIG. 12b; 3 μm thickness is not pictured). These films were flexible and exhibited good mechanical integrity throughout handling and electrochemical testing, indicating suitability as robust, binder-free (i.e., active carbon only, without any additional materials added during electrode preparation). These films also obviated the need to attach additional metal current collectors during testing, owing to their high conductivity (10-35 S/cm, Table 2). Metal current collectors add detrimentally to the weight of the cell.

Figure 13:
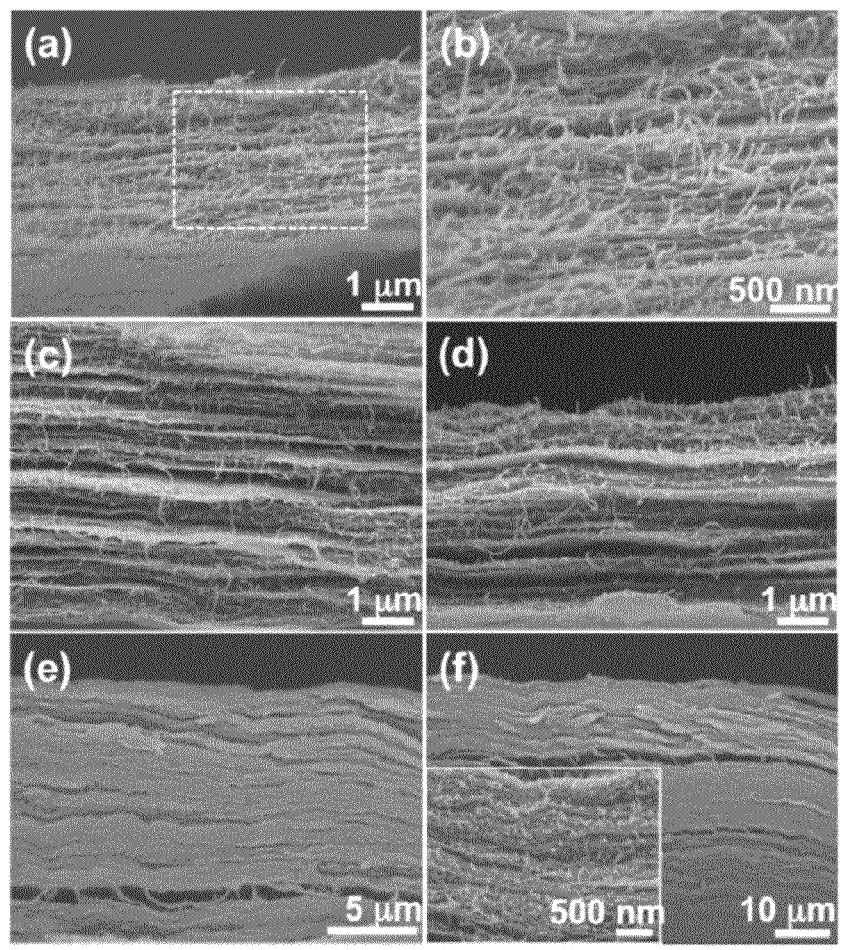
FIGS. 13a-13f are cross-sectional SEM images of ~6 µm thick electrodes prepared with (FIGS. 13a-13b) MWNT-COOH/GO.

Cross-sectional SEM images of MWNT-COOH/GO, MWNT-COOH/rGO—COOH, and MWNT/rGO electrodes were obtained with approximately 50 wt % MWNT-COOH and 50 wt % GO, and are shown in FIGS. 13a-13f. The GO sheets were densely stacked, and individual MWNTs were clearly seen protruding from between the stacked layers. The thicknesses of the obtained electrodes characterized by SEM ranged from ~6 μm (FIGS. 13a) to ~250 μm (FIG. 13f). Additionally, the hierarchical structure was controlled by modifying the weight ratio of MWNT-COOH compared to GO utilized in vacuum filtration, resulting in different loadings of the respective materials.

TABLE 2

| Sample ID | Electrical Conductivity (S/cm) |
|---|---|
| MWNT-COOH/GO (10 μm) | 14.3 ± 1.0 |
| MWNT-COOH/rGO-COOH (11.7 μm) | 34.3 ± 5.2 |

Figure 14:
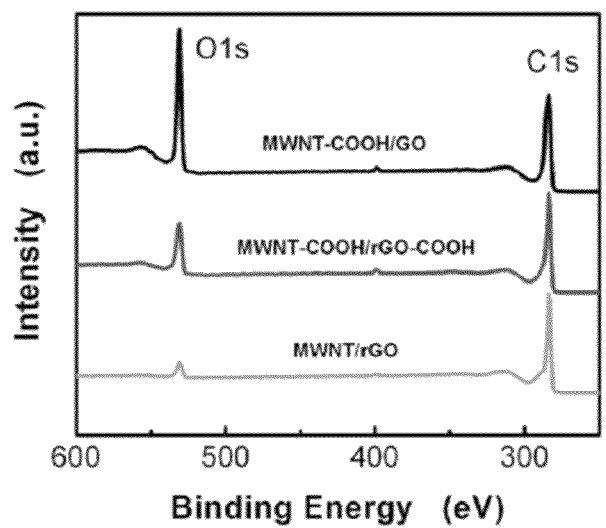
FIG. 14 (top) shows an XPS survey of MWNT-COOH/GO (black), MWNT-COOH/rGO—COOH (green), and MWNT/rGO (orange).
Figure 15:
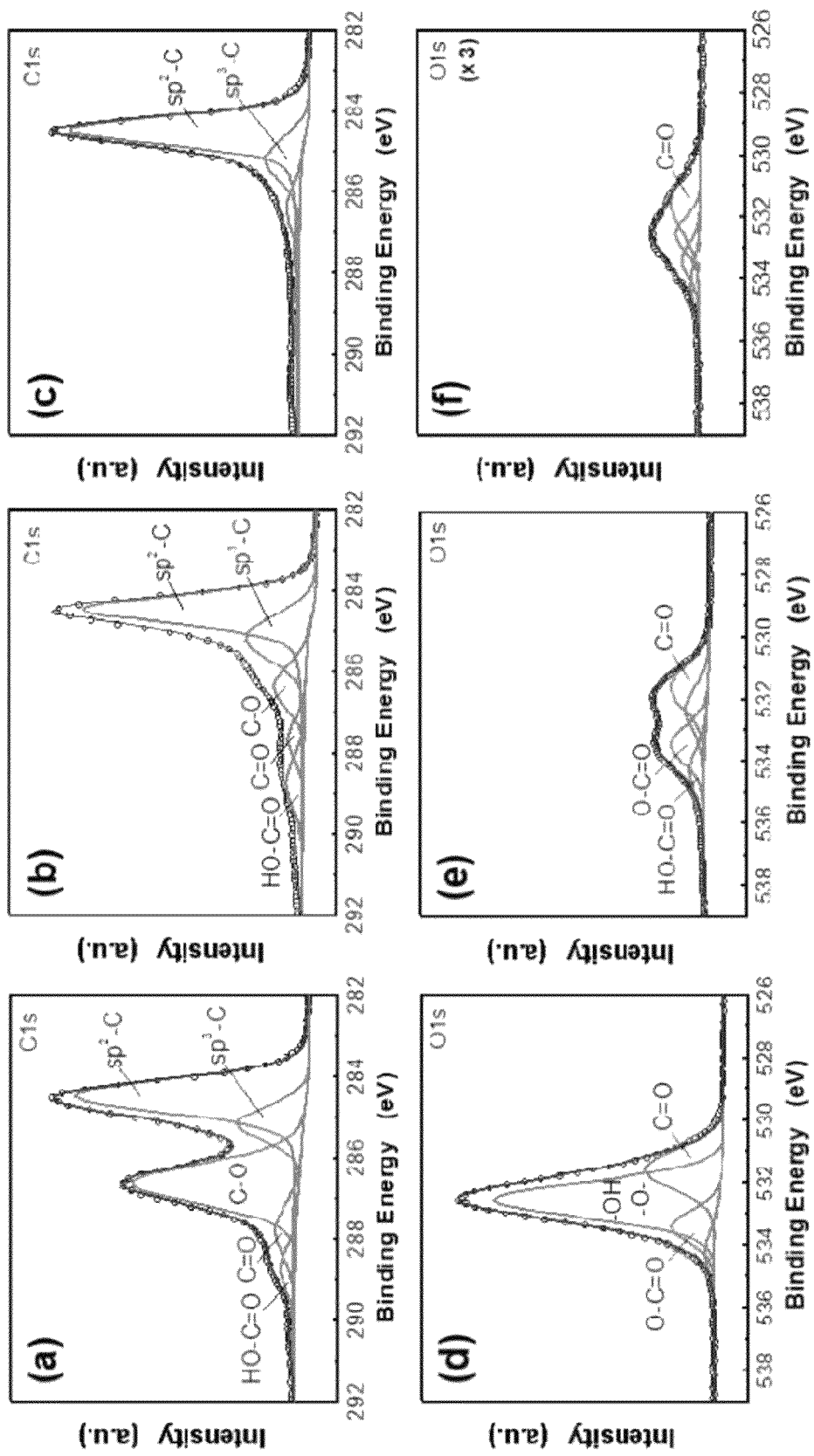
FIG. 15 shows XPS (a-c) C 1s and (d-f) O 1s BE regions of (a, d) MWNT-COOH/GO, (b, e) MWNT-COOH/rGO—COOH, and (c, MWNT/rGO. The intensity of (f) O 1 is of MWNT/rGO is magnified to 3 times. (g) Schematics of oxygen-functional groups on pristine MWNT-COOH and GO (MWNT-COOH/GO, left), heat-treated at 200° C. (MWNT-COOH/rGO—COOH, middle), and 900° C. (MWNT/rGO, right) in $H_2$/Ar.
Figure 15:
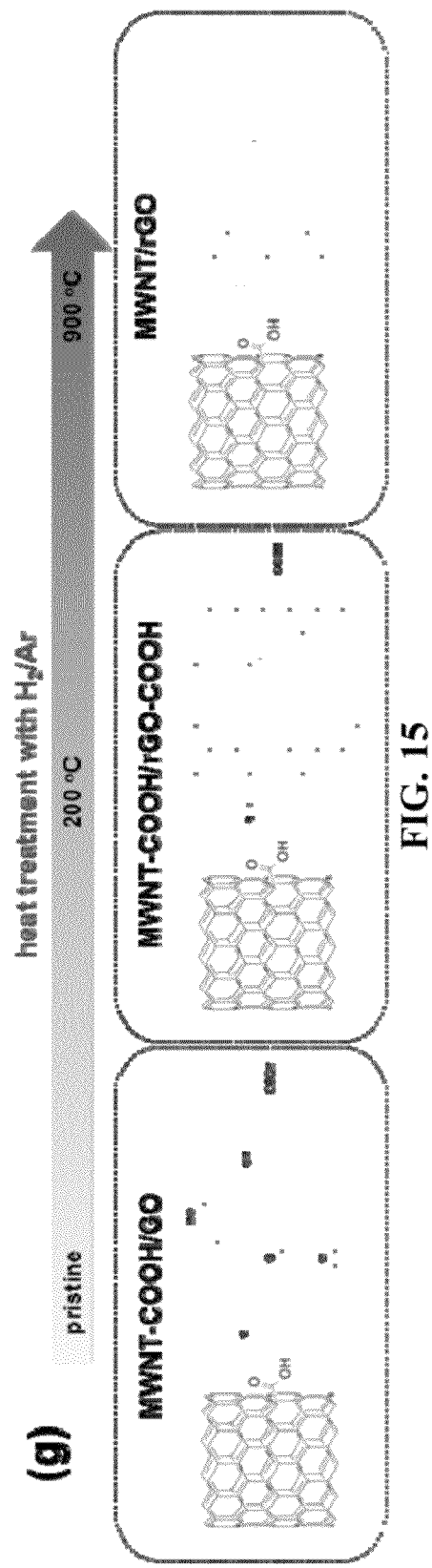

The heat-treatment temperature was found to significantly influence the quantity and type of functional groups found on the surface of MWNT-graphene electrodes, as shown from XPS data in FIG. 14 and FIG. 15. For XPS measurements, all spectra were calibrated by setting the main peak in the C is binding energy (BE) region to the $sp^2$-hybridized carbons (284.5 eV). From a survey scan in FIG. 14 (top), the concentration ratio of O/C was found to be 0.34 for MWNT-COO-HIGO, 0.18 for MWNT-COOHIrGO—COOH, and 0.06 for MWNT/rGO (FIG. 14, bottom), indicating that the amount of surface was tuned by controlling the heat treatments, with decreasing oxygen content with increasing heat treatment temperatures. The nitrogen content was negligible (0.01-0.02 ratio of N/C).

In order to investigate the chemical identities of oxygen functional groups as a function of heat-treatment temperature, high-resolution scans of the O1s and C1s spectra were examined (FIG. 15). Pristine MWNT-COOH/GO electrodes contain several predominant oxygen species including hydroxyl/epoxide groups (532.5±0.2 eV in the O1s spectrum, FIGS. 15d) and C—O (286.5±0.1 eV in C1s, FIG. 15a). These species were subsequently diminished by heat treatments. For MWNT-COOH/rGO—COOH heat treated at 200° C., both hydroxyl/epoxide (FIGS. 15e) and C—O groups (FIG. 15b) were found to decrease substantially relative to other remaining functional groups such as carbonyl (531.6±0.1 eV), ester (533.4±0.1 eV), and carboxylic groups (534.4±0.1 eV)[12]. This is consistent with a previous report in with hydroxyl/epoxide groups on graphene oxide were shown to be removed by heat treatments below 200° C.[13] XPS of MWNT/rGO electrodes heat-treated at 900° C. indicated that the majority of functional groups were removed (FIG. 15c and FIG. 15f, where the O1s spectra is magnified 3× for ease of viewing). These changes to the surface chemistry of MWNT-graphene electrodes are summarized schematically in FIG. 15g. It is noted that the XPS results indicating decreasing oxygen content with increasing heat treatment temperatures are consistent with electrical conductivity measurements (Table 2) which showed an increase in electrical conductivity from 14.3±1.0 S/cm (MWNT-COOH/GO) to 34.3±5.2 S/cm (MWNT-COOH/rGO—COOH) for electrodes from the same batch of pristine MWNT-COOH/GO, which could result from removal of electrically-insulating hydroxyl and epoxide groups found on the planar surface of graphene oxide.

Figure 16:
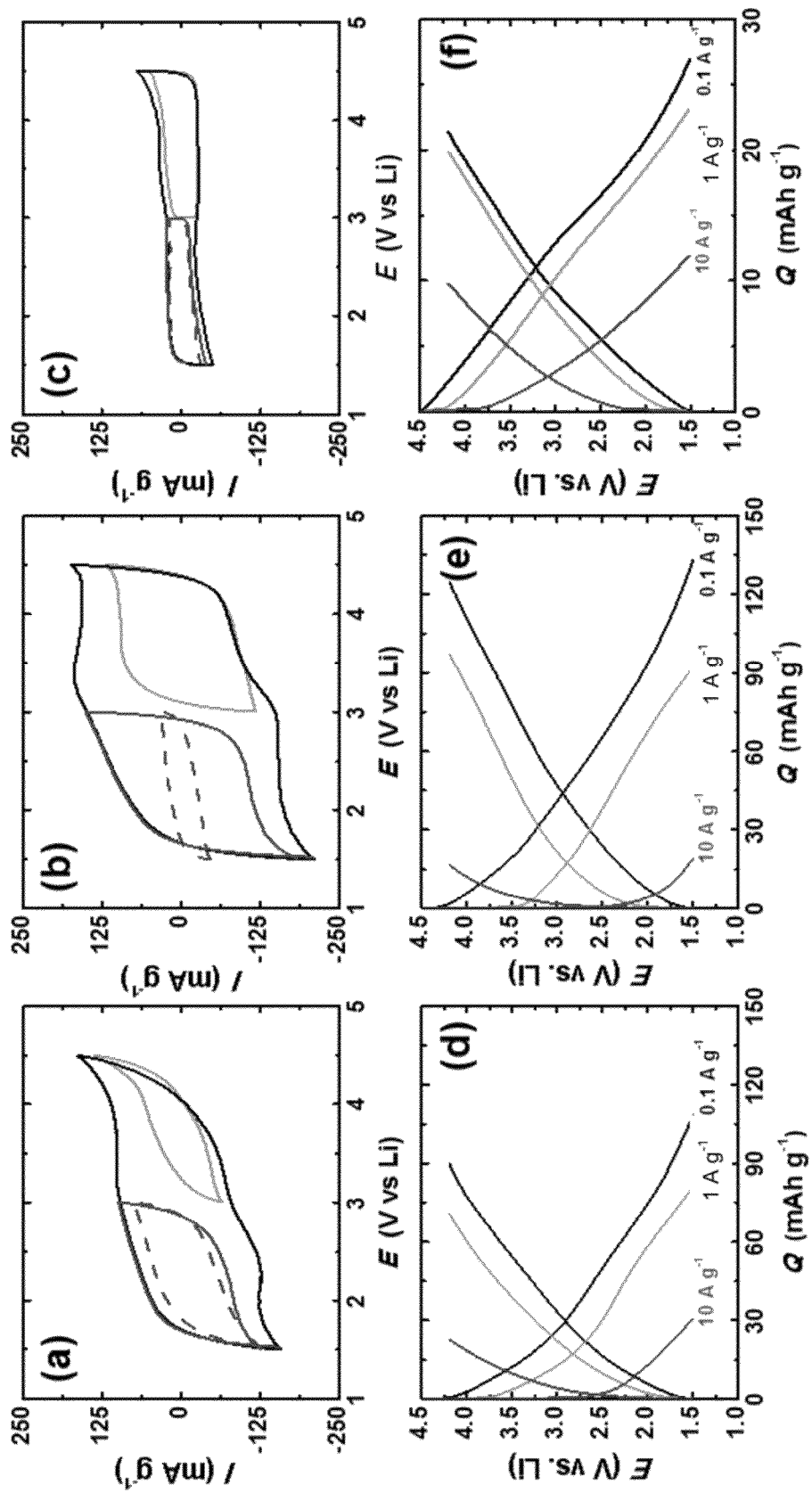
FIG. 16 shows potential-dependent CV (1 mV/s) and discharge/charge curves of (a, d) MWNT-COOH/GO (8.7 µm), (b, e) MWNT-COOH/rGO—COOH (4 µm), and (c, f) MWNT/rGO (3 µm) at 1 mV/s scan rate. Prior to each charge or discharge, the electrodes were held at 1.5 or 4.5 V, respectively, for 1 hour. All films were made from the same batch with different heat-treatment temperatures.
Figure 17:
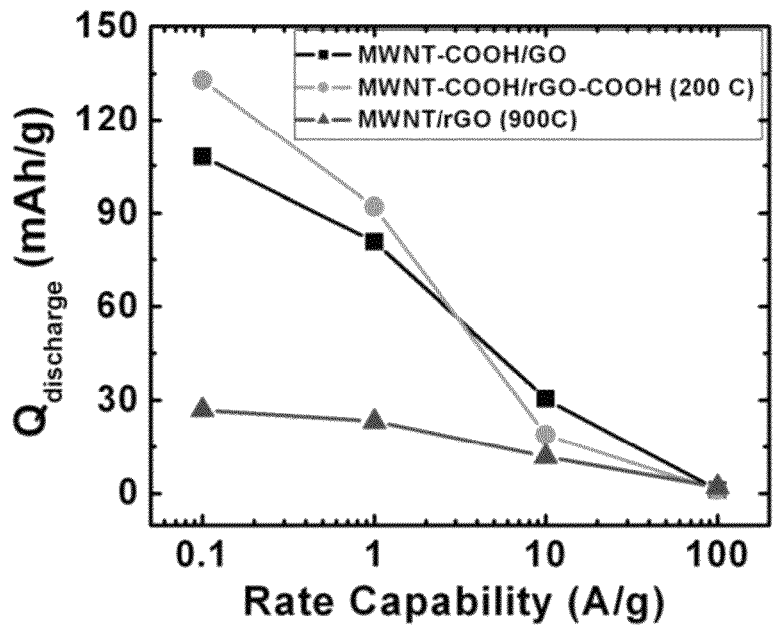
FIG. 17 shows gravimetric discharge capacity of the samples of FIG. 16 as a function of gravimetric current for pristine MWNT-COOH/GO, MWNT-COOHIrGO—COOH, and MWNT/rGO.

Electrochemical testing of MWNT-graphene electrodes indicated that the surface oxygen groups could be utilized to store charge Faradaically, as shown by potential-dependent cyclic voltammetry in FIGS. 16a-c. For MWNT-COOH/GO and MWNT-COOH/GO—COOH electrodes, the gravimetric current increased substantially when cycled in the voltage window 1.5-4.5 V vs. Li (black curve), compared to a restricted voltage window of 1.5-3.0 V (green curve) vs. Li or 3.0-4.5 V vs. Li (orange curve). This finding indicated that below ~3.0 V vs. Li, oxygen functional groups were electrochemically reduced, and were oxidized above that value. This in turn indicated a Faradaic charge storage mechanism in addition to double-layer charging of the carbon surface. While the gravimetric current of MWNT-COOH/rGO—COOH was found to be slightly higher than that of MWNT-COOH/GO, which could be related to higher electronic conductivity of the films following 200° C. heat treatment (Table 2), heat treatment at a higher temperature of 900° C. resulted in a dramatic decrease in the gravimetric current (FIG. 16c). Further, the gravimetric current of MWNT/rGO was almost the same regardless of the scan window. These findings correlated well with XPS results, which indicate that the majority of oxygen-containing groups are removed following heat treatment at 900° C. Since oxygen groups contribute substantially to the gravimetric current via Faradaic reactions, the MWNT/rGO electrodes without functional groups yield lower gravimetric currents and potential-independent behavior, consistent with double-layer capacitor behavior. Galvanostatic rate-capability testing of the MWNT-graphene electrodes (FIGS. 16d-f) showed similar trends at 0.1 A/g as those observed from cyclic voltammetry, with slightly higher gravimetric capacity obtained for MWNT-COOH/rGO—COOH (~145 mAh/g), and substantially lower capacity obtained for MWNT/rGO (~30 mAh/g). With increasing gravimetric currents, the obtained capacity decreased significantly, which may be related in part to ohmic limitations within the carbon matrix at high rate, partly attributable to the presence of defects (oxygen groups) on the surface and edges of MWNTs and GO. The rate-dependent performance is summarized in FIG. 17. While MWNT-COOH/GO and MWNT-COOH/rGO—COOH showed an advantage at low gravimetric current (<1 A/g), at higher currents (10 and 100 A/g), the capacities were comparable for all electrodes. This suggested that oxygen functional groups, which can be accessed at low currents, could become rate limiting at high currents, allowing only double-layer charging.

Figure 18:
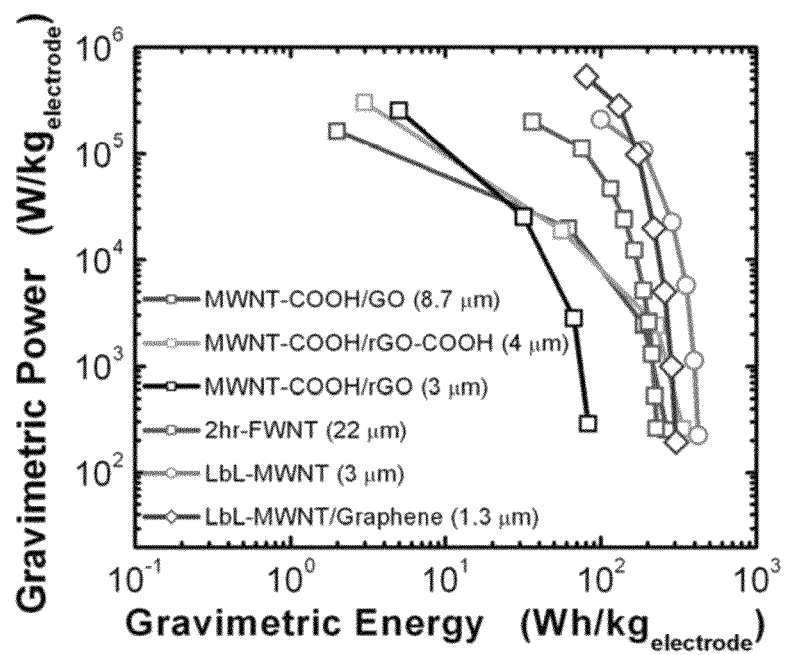
FIG. 18 shows a Ragone plot of gravimetric energy and power performance of MWNT-graphene electrodes (green, orange and black squares) obtained from gravimetric discharge data in FIG. 16(d-f) and additional data. For comparison, the energy-power performance of VF-FWNTs, and LbL all-MWNT and MWNT-graphene electrodes[4,14] with comparable thicknesses are shown.
Figure 19:
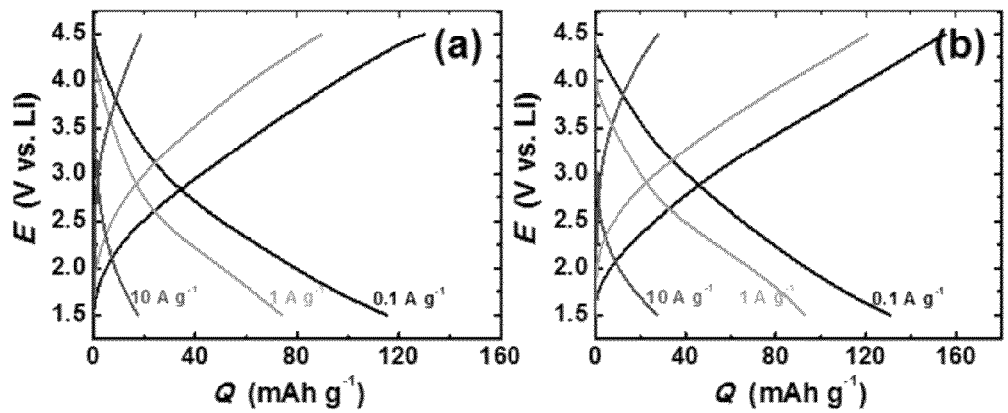
FIG. 19 shows (a) gravimetric discharge and charge in the voltage range 1.5-4.5 V vs. Li of (a) ~20 µm thickness of MWNT-COOH/GO and (b) ~11 µm of MWNT-COOH/rGO—COOH. Prior to each charge or discharge, the electrodes were held at 1.5 or 4.5 V, respectively, for 1 hour. Both films were made from the same batch of MWNT-COOH/GO.
Figure 20:
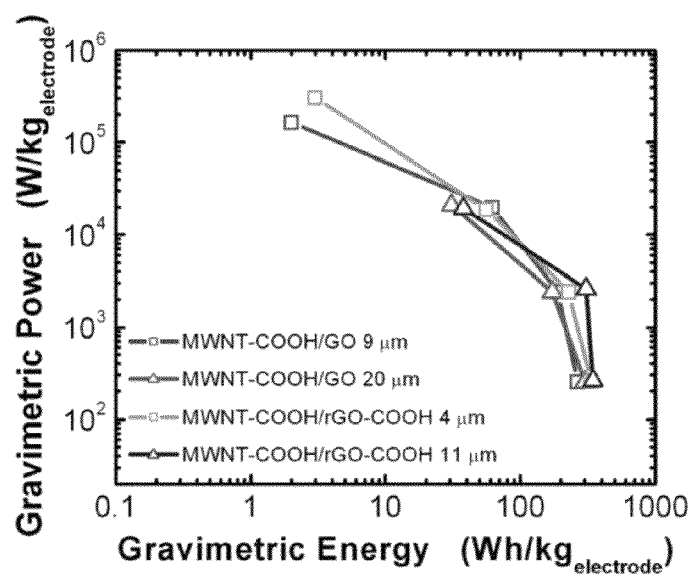
FIG. 20 shows (a) a Ragone plot comparing MWNT-COOH/GO and MWNT-COOH/rGO—COOH electrodes at two different electrode thicknesses each.

The energy and power performance of MWNT-graphene electrodes was determined from galvanostatic data (FIG. 16$d$-$f$) and is shown in a Ragone Plot in FIG. 18, where all values were normalized to the weight of the positive electrode. At low power (~250 W/kg), the gravimetric energy of MWNT-COOH/GO and MWNT-COOH/rGO—COOH ranged between ~250 Wh/kg and ~350 Wh/kg, respectively, while the obtainable energy from MWNT/rGO was much lower (~80 Wh/kg). The low-power performance of MWNT-COOH/rGO—COOH and MWNT/rGO were comparable to that of functionalized few-walled carbon nanotube electrodes (FWNT[5]) synthesized using the vacuum filtration method and disclosed above, as well as Layer-by-Layer assembled LbL-MWNT/graphene electrodes.[8,14] With increasing power, however, the attained energies of MWNT-graphene electrodes declined rapidly, delivering similar energy (~50 Wh/kg) at a power of ~20 kW/kg. Comparable rate capability and energy-power trends were also found for thicker electrodes of up to 20 µm and 11 µm for MWNT-COOH/GO and MWNT/rGO—COOH, respectively (FIGS. 19 and 20).

Figure 21:
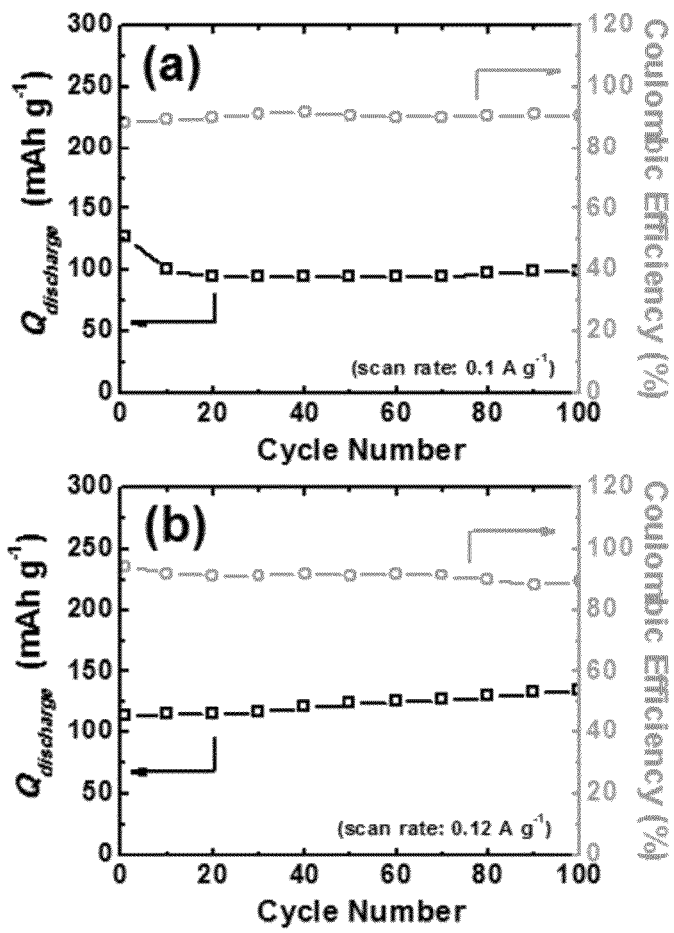
FIG. 21 shows gravimetric capacity and Coulombic efficiency of (a) MWNT-COOH/GO and (b) MWNT-COOH/rGO—COOH electrodes cycled between 1.5-4.5 V vs. Li at ~0.1 A/g.
Figure 22:
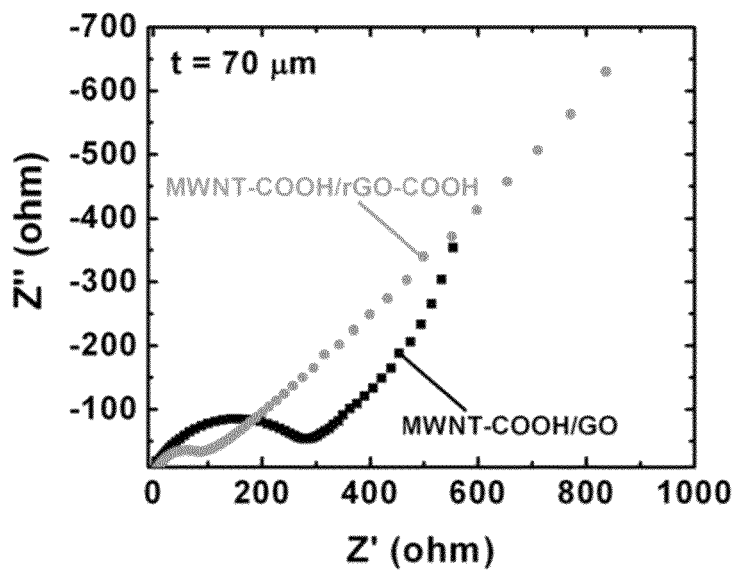
FIG. 22 shows (a) electrochemical impedance spectra of MWNT-COOH/GO and MWNT-COOH/rGO—COOH electrodes (70 pm) obtained in the frequency range 10 mHz-100 KHz with a 10 mV amplitude.

To assess the practical lifetime of MWNT-graphene electrodes, electrodes were cycled galvanostatically for 100 cycles at ~0.1 A/g (FIG. 21). In both cases, the discharge capacity and high Coulombic efficiency (>~90%) were retained over 100 cycles, indicating that functional groups on MWNT-COOH/GO or MWNT-COOH/rGO—COOH were stable and can reversibly react with lithium ions. Additionally, electrochemical impedance testing of MWNT-COOH/GO and MWNT-COOH/rGO—COOH electrodes in the frequency range 10 mHz-10 kHz revealed similar impedance profiles as VF-FWNT electrodes (FIGS. 10 and 11) but with larger semi-circles in the mid-frequency range. This could be related to high charge-transfer resistance, particularly in the case of MWNT-COOH/GO which had an O/C ratio of 0.34, significantly higher than that of MWNT-COOH/rGO—COOH (0.18) or 4-hr oxidized FWNT (0.20). The different shapes of the semi-circles corresponding to Faradaic reactions between MWNT-COOH/GO and MWNT-COOH/rGO—COOH may originate from the nature of different surface chemistries on MWNT-graphene electrodes, which could influence the charge-transfer kinetics.

Example 3

Self-supporting, binder-free electrodes without a metal current collector were also LbL assembled from positively charged HCl-doped polyaniline nanofibers and negatively charged oxidized multiwall carbon nanotubes (MWNTs).

Polyaniline nanofiber (PANi) synthesis. Rapid polymerization[15] of aniline (99.5% purity) with ammonium peroxydisulfate (99% purity) provided a solution of PANi nanofibers. This solution was used as the cationic polyelectrolyte during LbL assembly. Briefly, aniline hydrochloride (purum; 2.59 g, 20 mmol) was dissolved in distilled 1M HCl in a volumetric flask to provide 50 mL of solution. Ammonium peroxydisulfate (purum; 5.71 g, 25 mmol) was dissolved in 1M HCl also to provide 50 mL of solution. Both solutions were kept for 1 h at room temperature, then mixed in a beaker, briefly stirred, and left at rest to polymerize for 24 h. The PANi was collected as a fiber suspension using a centrifuge (at 10,000 rpm for 15 mins) after washing two times with 100-mL deionized Milli-Q water adjusted to pH ~2.5 and resuspending the fibers.

Assembly of PANi/MWNT-COOH. The dialyzed PANi nanofiber solution (pH 2.5; 1 mg mL$^{-1}$) and MWNT-COOH (pH 3.5; 1 mg mL$^{-1}$, prepared as described above) solutions were sonicated a using a Branson Bransonic 3510 ultrasonic cleaner (40 kHz) in Milli-Q water (18.2 MΩ·cm) for 30 mins to form stable dispersions. The polyelectrolyte solutions were alternately vacuum filtered on a substrate (Whatman® PC filtration membrane with 2 µm pore size and 25 mm diameter, or a nylon electrospun mat with effective pore size 2 µm). To make a 10 µm. PANi/MWNT-COOH film, approximately 12 mL of PANi and 20 mL of MWNT-COOH solution were used, respectively. Thus, the thickness of the films was controlled by varying the volumes of the polyelectrolytes used. Following filtration, the air-dried PANi/MWNT-COOH film was peeled off from the filtration membrane and dried in a convection oven at 60° C. for 12 h.

Film characterization. The microstructures of the films were investigated using SEM (JEOL 6700) without any gold sputtering. Sheet resistance was measured by a 4-point probe (Signatone S-302-4) with a device analyzer (Keithley 4200). The film thickness was measured by a Digimatic Micrometer (Mettler Toledo) in three different locations on the film and mass was obtained by balance (Mettler Toledo).

Figure 23:
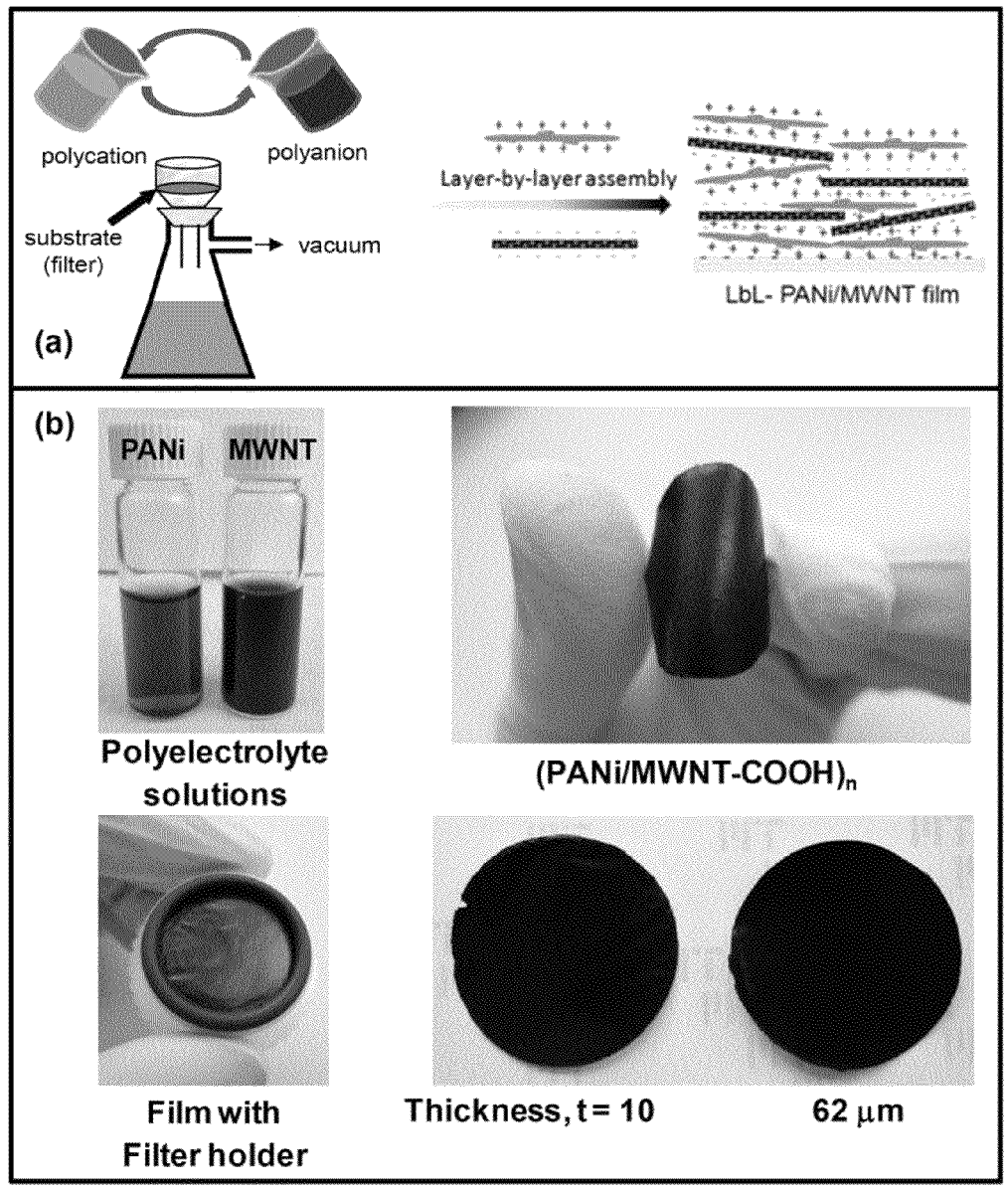
FIG. 23 shows (a) a schematic illustration of vacuum-filtration Layer-by-layer (LbL) process of polyaniline nanofibers and oxidized MWNTs. (b) Images of (top left) PANi nanofibers (pH 2.5) and MWNT-COOH nanotube (pH 3.5) solutions. PANi/MWNT free-standing film (top right), a PANi/MWNT-COOH electrode in the filter holder, (bottom left) and two PANi/MWNT-COOH electrodes of 10 μm and 62 μm. All electrodes shown are following vacuum filtration, drying, and removal from the substrate.

Hierarchical structures of PANi/MWNT-COOH were achieved through the alternate deposition using vacuum filtration of the PANi and MWNT-COOH solution (FIG. 23$a$). Images of the resulting self-supporting films 25 mm in diameter are shown in FIG. 23$b$. Films with larger diameter were attained by using substrates (filters) of larger diameter. Self-supporting films with thicknesses ranging from approximately 10 µm to approximately 62 µm were obtained using this process (FIG. 23$b$). These films were flexible and exhibited good mechanical integrity throughout handling and electrochemical testing, suitability as robust, binder-free (i.e., only polyaniline nanofibers and multi-walled carbon nanotubes were used, without any additional materials added during electrode preparation). These films also obviated the need to attach additional metal current collectors during testing, owing to their high conductivity (e.g., 2 S/cm to 6.4 S/cm).

Figure 24:
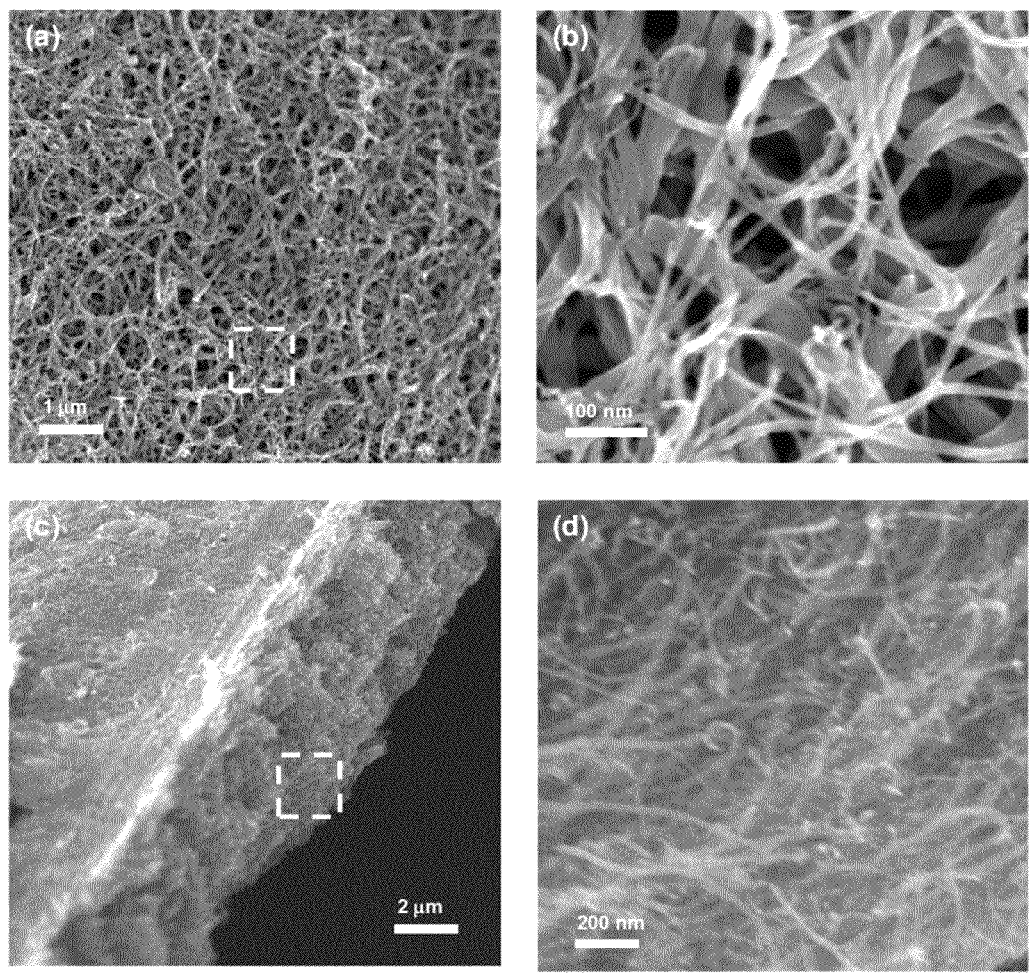
FIG. 24 shows surface morphology and cross-sectional SEM images of (a) 10 μm thick PANYMWNT-COOH electrode; (b) high magnification of area highlighted in (a); (c) cross-section of PANi/MWNT-COOH electrode; (d) high magnification of area highlighted in (c).

Surface morphology and cross-sectional SEM images of PANi/MWNT-COOH electrodes were obtained with approximately 41 wt % MWNT-COOH and 59 wt % PANi, and are shown in FIG. 24. The PANi nanofibers had diameters from 50±20 nm, and MWNT-COOH had diameters of about 15±5 nm. Highly porous and interconnected LbL films were clearly seen where the MWNTs were layered over PANi nanofibers (FIGS. 24$a$ and 24$b$). Cross-sectional SEM microstructures showed the morphology of protruding PANi nanofibers and MWNTs of the LbL electrode (FIGS. 24$c$ and 24$d$). The thickness of the electrode was approximately 10 µm as characterized by SEM and micrometer gauge measurement. Additionally, the hierarchical structure was controlled easily by controlling the weight ratio of PANi nanofibers to MWNT-COOH utilized in vacuum filtration, resulting in different loadings of the respective materials.

Example 4

Figure 25:
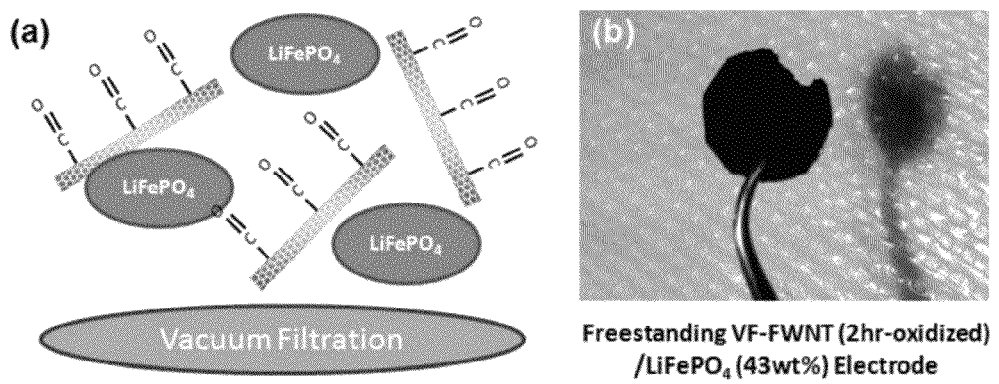
FIG. 25a illustrates the formation of a self-supporting nanostructured carbon electrode including lithium metal oxides via a vacuum filtration method.
FIG. 25b is a photograph of such an electrode.

Functionalized nanostructured carbon can be composited with conventional lithium metal oxide positive materials ($LiCoO_2$, $LiFePO_4$, or $LiCoPO_4$) via vacuum filtration method for lithium-ion battery positive electrodes (FIG. 25a). In this composite electrode system, functionalized nanostructured carbon not only can mechanically support lithium metal oxide positive materials ($LiCoO_2$, $LiFePO_4$, or $LiCoPO_4$), but also can increase energy and power density of the electrodes. FIG. 25b shows an example of freestanding vacuum-filtered 2hr-oxidzized FWNT/$LiFePO_4$ composite electrode.

Figure 10:
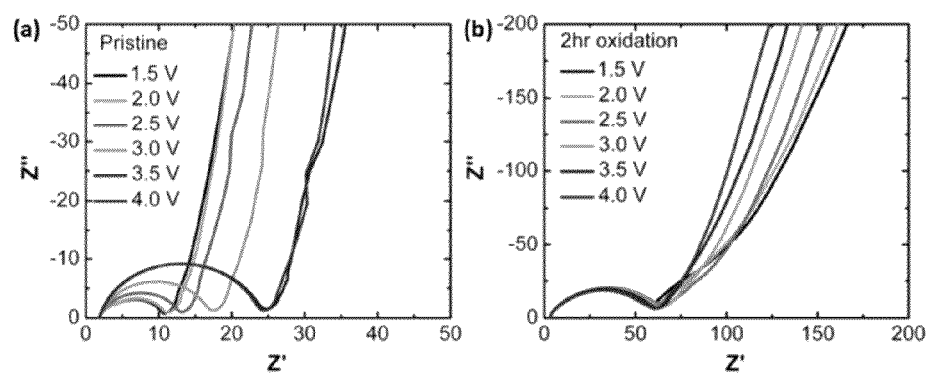
FIG. 10 shows electrochemical impedance spectra of pristine (left) and 2-hour oxidized VF-FWNT electrodes as a function of applied potential in the voltage range 1.5-4.0 V vs. Li.
Figure 11:
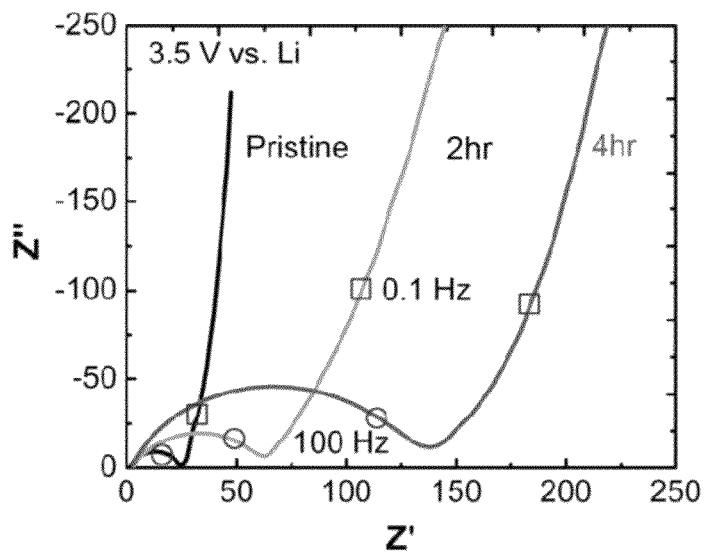
FIG. 11 shows electrochemical impedance spectra of pristine, 2-hour and 4-hour VF-FWNT electrodes at an applied potential of 3.5 V vs. Li. Circles, 100 Hz; squares: 0.1 Hz.
Figure 26:
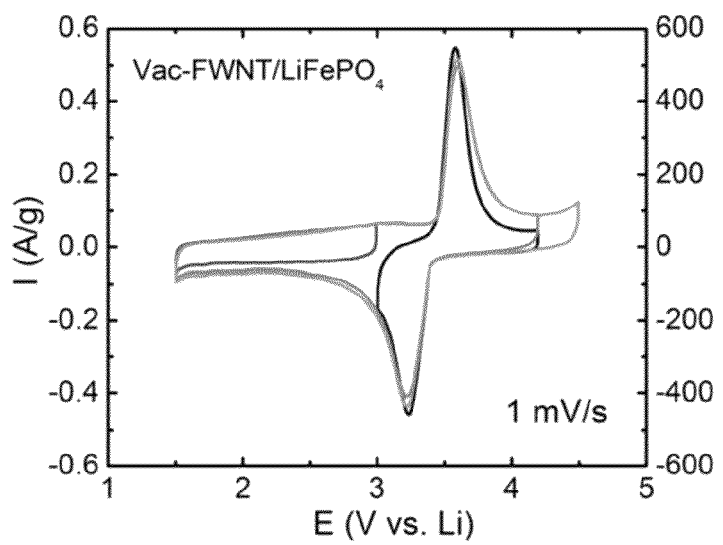
FIG. 26 shows potential-dependent cyclic voltammetry and differential capacitance of VF-FWNT (2 hr-oxidized)/LiFePO$_4$ composite electrode in lithium cells. The examined potential windows were 3.0-4.2 V vs. Li (black), 1.5-3.0 V vs. Li (green), 1.5-4.2 V vs. Li (gray), and 1.5-4.5 V vs. Li (orange) at a scan rate of 1 mV/s.
Figure 27:
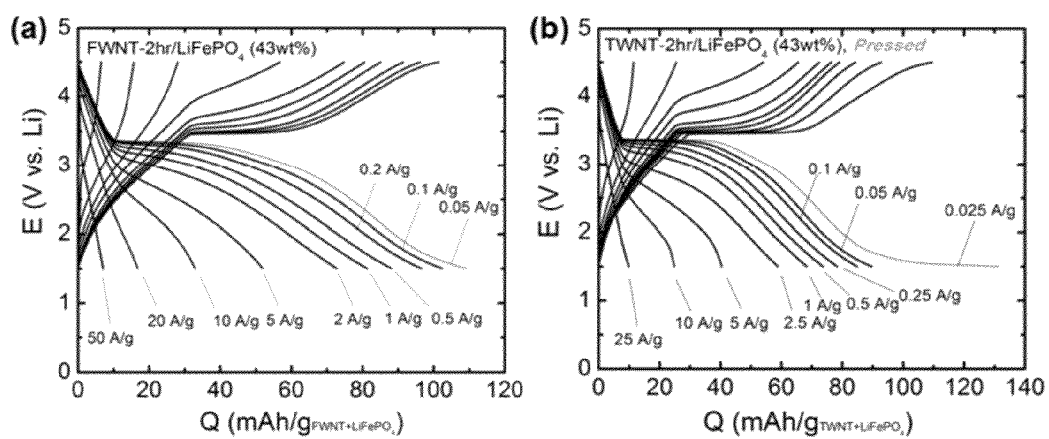
FIGS. 27a-27b show galvanostatic rate capability of (FIG. 27a) as-prepared and (FIG. 27b) pressed VF-FWNT (2 hr-oxidized)/LiFePO$_4$ composite electrodes in lithium cells. The voltage window was 1.5-4.5 V vs. Li and the gravimetric currents ranged from 0.025 A/g-50 A/g. Preceding charge or discharge, the cells were held at a constant voltage of 4.5 or 1.5 V vs. Li, respectively, for 30 minutes. The thicknesses of the electrodes s were ~100 μm (0.5 g/cm$^3$) for the as-prepared one and ~40 μm (1.4 g/cm$^3$) for the pressed electrode.

FIG. 26 shows potential-dependent cyclic voltammetry and differential capacitance of VF-FWNT (2hr-oxidized)/$LiFePO_4$ composite electrode in lithium cells. We can see characteristic Redox peaks of $LiFePO_4$ around 3.5 V vs. Li, showing clearly difference with CV of carbon only electrodes (FIG. 10). FIG. 27a shows the results of a galvanostatic rate capability test of as-prepared VF-FWNT (2hr-oxidized)/$LiFePO_4$ (43 wt %) composite electrode. The electrode showed a charge/discharge plateau of $LiFePO_4$ around 3.5 V vs. Li as well as the sloping profile of functionalized carbon, and had a high gravimetric capacity of ~110 mAh/g based on the mass of cathode (FWNT+$LiFePO_4$) at current density of 0.05 A/g. The rate capability of this electrode was remarkable, which maintained ~50% of the maximum capacity (~60 mAh/g) at 5 A/g. However, the density of electrode was only ~0.5 g/cm$^3$, reducing the volumetric energy and power density of the electrodes. To overcome the low density issue, as-prepared electrodes were pressed using a press, which resulted in an increase of the density to ~1.4 g/cm$^3$. This pressed electrode also showed high gravimetric capacity of ~120 mAh/g as well as good rate-capability (FIG. 27b), indicating that oxidized nanostructured cabon can boost the energy and power density of conventional lithium metal oxide electrode materials.

Example 5

Figure 28:
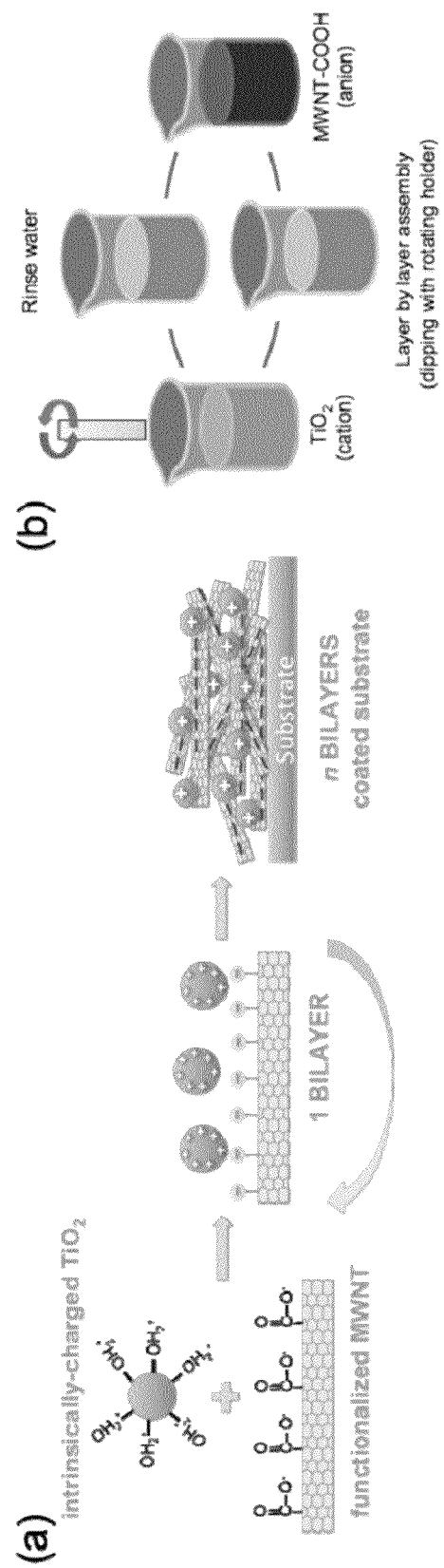
FIG. 28a provides a schematic for fabrication of composite electrodes from oxidized nano-carbons and metal oxide nanoparticles (e.g., TiO$_2$) via the layer-by-layer (LbL) method.
FIG. 28b shows a schematic of the process flow for the spin LbL process. Each single repetition yields one bilayer.

Functionalized nanostructured carbon can be combined with metal oxide nanoparticles (e.g. $TiO_2$) via the vacuum filtration or the layer-by-layer method (illustrated in FIGS. 28a-28b) for lithium-ion battery negative electrodes. In this composite electrode system, functionalized nanostructured carbon not only can mechanically support metal oxide nanoparticles, but also can increase the power density of the metal oxide nanoparticles by providing an interconnected conducting carbon framework.

Figure 29:
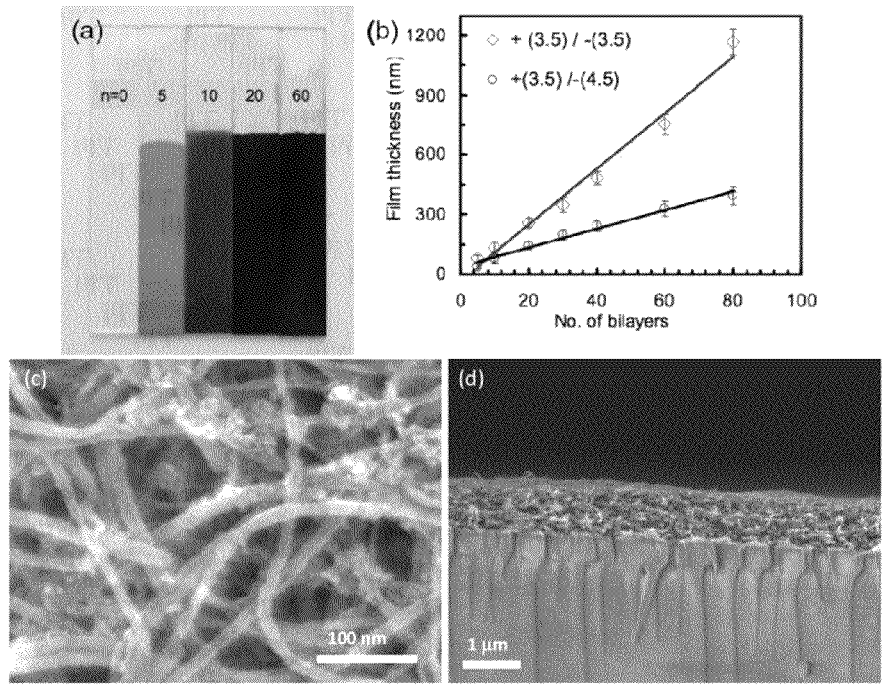
FIG. 29a is an image of LbL-assembled TiO$_2$-MWNT electrodes corresponding to 0, 5, 10, 20, and 60 bilayers coated onto a conducting glass substrate.
FIG. 29b shows the thickness of resulting films as a function of bilayer number for two different pH dispersion combinations (where + refers to TiO$_2$ or cation pH, and – refers to MWNT or anion pH).
FIG. 29c is a scanning electron microscopy image of the surface of the electrode and FIG. 29d is a cross-sectional image of an 80 bilayer LbL-TiO$_2$/MWNT film.

Negatively-functionalized MWNTs and positively-charged anatase $TiO_2$ nanoparticles (FIG. 28a) were assembled into a composite electrode utilizing either the spin layer-by-layer technique or the VF process, where the pH of nanomaterial dispersions can be controlled in order to influence the resulting thicknesses and growth behaviors of films as a function of bilayer number (FIG. 29b). An optical image of LbL-assembled films on conducting glass slides (FIG. 29a) showed that the resulting films uniformly coat the substrate, with optical properties (transparency) that was controlled by modulating the thickness. The scanning electron microscopy (SEM) (FIG. 29c) shows the surface morphology of the LbL-$TiO_2$/MWNT films where the $TiO_2$ nanoparticles were supported over the MWNTs. The layer-by-layer assembly allowed the incorporation of $TiO_2$ nanoparticles in the MWNTs without losing any porosity. The cross-sectional SEM in FIG. 29d shows a 80 bilayers of LbL film where a highly uniform coating of $TiO_2$/MWNT was observed.

Figure 30:
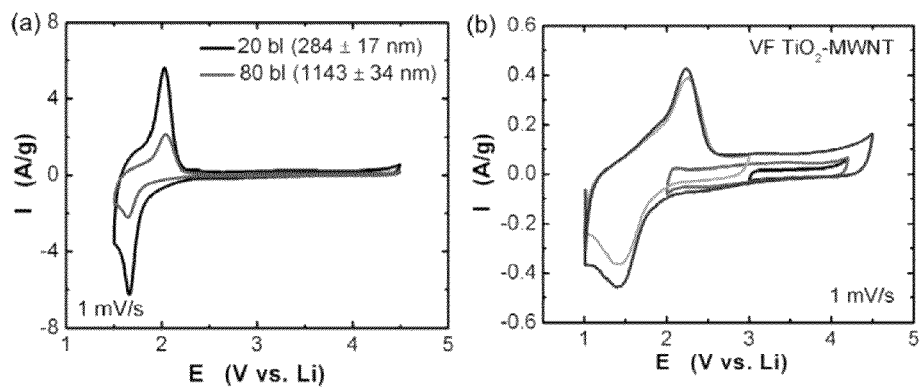
FIG. 30a shows cyclic voltammetry in lithium cells at 1 mV/s of 20 and 80 bilayer TiO$_2$-MWNT electrodes (+2.5/-3.5 pH) over the voltage window 1.5-4.5 V vs. Li.
FIG. 30b shows potential-dependent cyclic voltammetry at 1 mV/s of VF-assembled TiO$_2$-MWNT electrodes (thickness=19 μm).
Figure 31:
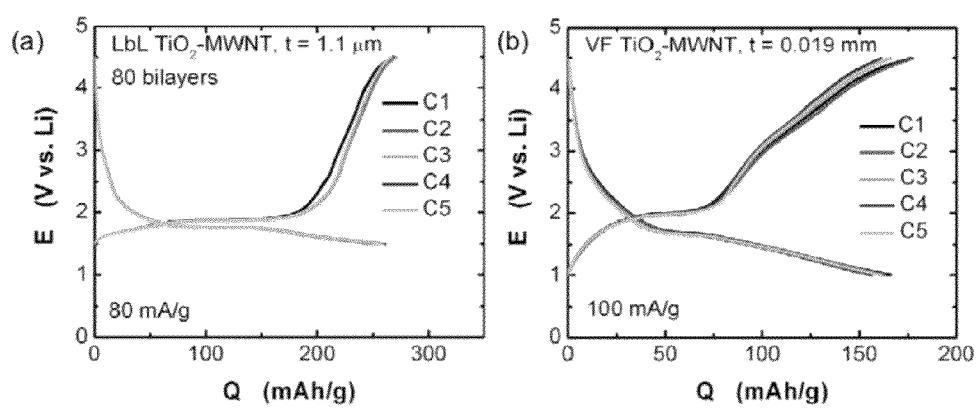
FIGS. 31a-31b show the galvanostatic rate capability of (FIG. 31a) 80 bilayer TiO$_2$-MWNT electrodes (thickness=1.1 μm) at 80 mA/g$_{electrode}$ and (FIG. 31b) Vf-as-sembled TiO$_2$-MWNT electrodes (thickness=19 um) at 100 mA/g$_{electrode}$ in lithium cells. The voltage window was 1.5-4.5 V vs. Li. Preceding charge or discharge, the cells were held at a constant voltage of 4.5 or 1.5 V vs. Li, respectively, for 1 hour.

These electrodes were tested in lithium cells with organic electrolyte (1 M $LiPF_6$ in EC:DMC) in order to investigate their application as negative electrodes in lithium ion batteries. Cyclic voltammetry (FIG. 30) revealed clear characteristic redox peaks centered around ~1.7 V vs. Li, which is well known to be related to intercalation of lithium ions into $TiO_2$. The gravimetric current associated with $TiO_2$ redox reactions in cyclic voltammetry tests was found to decrease with increasing thickness of electrodes (FIGS. 30a-30b). Under galvanostatic conditions, LbL electrodes (80 bilayers) were found to deliver ~270 mAh/$g_{electrode}$ at 80 mA/$g_{electrode}$, and the VF-assembled $TiO_2$-MWNT electrodes delivered ~165 mAh/$g_{electrode}$ at 100 mA/$g_{electrode}$ (FIGS. 31a-31b). These values were comparable or greater than the theoretical capacity or pure anatase $TiO_2$ (168 mAh/g for $Li_xTiO_2$, x=0.5) indicating that both $TiO_2$ and carbon can be used for charge storage. Both the LbL and the VF-assembled $TiO_2$-MWNT electrodes exhibited excellent cycling stability, showing no degradation over tens of cyclic voltammetry cycles.

REFERENCES

Each of the following is incorporated by reference in its entirety.

1. S. W. Lee, B.-S. Kim, S. Chen, Y. Shao-Horn and P. T. Hammond, *Journal of the American Chemical Society*, 2009, 131, 671-679.
2. H. Ago, T. Kugler, F. Cacialli, W. R. Salaneck, M. S. P. Shaffer, A. H. Windle and R. H. Friend, *Journal of Physical Chemistry B*, 1999, 103, 8116-8121.
3. C. Kozlowski and P. M. A. Sherwood, *Journal of the Chemical Society-Faraday Transactions I*, 1985, 81, 2745-2756.
4. S. W. Lee, N. Yabuuchi, B. M. Gallant, S. Chen, B. S. Kim, P. T. Hammond and Y. Shao-Horn, *Nature Nanotechnology*, 2010, 5, 531-537.
5. D. Y. Kim, H. Sugime, K. Hasegawa, T. Osawa and S. Noda, *Carbon*, 2011, 49, 1972-1979.
6. B. E. Conway, *Electrochemical Supercapacitors: Scientific Fundamentals and Technological Applications*, Kluwer, Dordrecht, the Netherlands, 1999.
7. P. Simon and Y. Gogotsi, *Nature Materials*, 2008, 7, 845-854.
8. H. R. Byon, S. W. Lee, S. Chen, P. T. Hammond and Y. Shao-Horn, *Carbon*, 49(2) 457-467 (2011).
9. W. S. Hummers and R. E. Offeman, *J. Am. Chem. Soc.*, 1958, 80, 1339.
10. N. I. Kovtyukhova, P. J. Ollivier, B. R. Martin, T. E. Mallouk, S. A. Chizhik, E. V. Buzaneva and A. D. Gorchinskiy, *Chem. Mater.*, 1999, 11, 771-778.
11. D. Li, M. B. Muller, S. Gilje, R. B. Kaner and G. G. Wallace, *Nat. Nanotech.*, 2008, 3, 101-105.
12. U. Zielke, K. J. Hüttinger and W. P. Hoffman, *Carbon*, 1996, 34, 983-998.
13. O. C. Compton, D. A. Dikin, K. W. Putz, C. Brinson and S. T. Nguyen, *Adv. Mater.*, 2010, 22, 892-896.
14. S. W. Lee, B. M. Gallant, H. R. Byon, P. T. Hammond and Y. Shao-Horn, *Energy & Environmental Science*, 2011, 4, 1972-1985.

Other embodiments are within the scope of the following claims.

What is claimed is:

1. A self-supporting carbon electrode comprising nanostructured carbon, wherein the nanostructured carbon has a length greater than 100 μm and less than 1,000 μm,
   wherein the self-supporting carbon positive electrode consists essentially of nanostructured carbon and the nanostructured carbon is oxygen-functionalized nanostructured carbon; and
   the self-supporting carbon positive electrode has a thickness of 10 μm or greater.

2. The self-supporting carbon electrode of claim 1, wherein the oxygen-functionalized nanostructured carbon includes oxygen-functionalized few-walled carbon nanotubes (FWNTs), multi-walled carbon nanotubes (MWNT)-COOH, graphene oxide (GO), reduced graphene oxide (rGO), reduced graphene oxide (rGO—COOH), or a combination thereof.

3. The self-supporting carbon electrode of claim 2, wherein the oxygen-functionalized nanostructured carbon includes oxygen-functionalized FWNTs having an aspect ratio of 10,000 or greater.

4. The self-supporting carbon electrode of claim 1, wherein the self-supporting carbon electrode consists essentially of oxygen-functionalized conductive carbon.

5. The self-supporting carbon electrode of claim 1, wherein the self-supporting carbon positive electrode consists essentially of carbon and oxygen.

6. An energy storage device comprising a self-supporting carbon electrode comprising oxygen-functionalized nanostructured carbon,
wherein the self-supporting carbon positive electrode consists essentially of nanostructured carbon and the nanostructured carbon is oxygen-functionalized nanostructured carbon; and
the self-supporting carbon electrode has a thickness of 10 μm or greater.

7. The energy storage device of claim 6, wherein the oxygen-functionalized nanostructured carbon includes oxygen-functionalized few-walled carbon nanotubes (FWNTs), multi-walled carbon nanotubes (MWNT)-COOH, grapheme oxide (GO), reduced grapheme oxide (rGO), reduced grapheme oxide (rGO—COOH), or a combination thereof.

8. The energy storage device of claim 7, wherein the oxygen-functionalized nanostructured carbon includes oxygen-functionalized FWNTs having an aspect ratio of 10,000 or greater.

9. The energy storage device of claim 6, wherein the self-supporting carbon electrode consists essentially of oxygen-functionalized conductive carbon.

10. The energy storage device of claim 6, wherein the self-supporting carbon electrode consists essentially of carbon and oxygen.

11. The energy storage device of claim 6, wherein the device provides at least 100 Wh/kg$_{electrode}$ at 10 kW/kg$_{electrode}$.

12. The energy storage device of claim 6, further comprising a lithium-containing electrode and an electrolyte interposed between the lithium-containing electrode and the self-supporting carbon positive electrode.

13. The energy storage device of claim 12, wherein the energy storage device is a rechargeable lithium battery.

* * * * *